(12) United States Patent
Dupont et al.

(10) Patent No.: US 7,772,351 B2
(45) Date of Patent: Aug. 10, 2010

(54) USE OF A COPOLYMER HAVING AT LEAST ONE GRAFTED ALKOXY OR HYDROXY POLYALKYLENE GLYCOL FUNCTION AS AN AGENT FOR IMPROVING OPTICAL BRIGHTENING ACTIVATION, AND PRODUCTS OBTAINED

(75) Inventors: Francois Dupont, Lyons (FR); Christian Jacquemet, Lyons (FR); Jean-Marc Suau, Lucenay (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 1196 days.

(21) Appl. No.: 10/533,794

(22) PCT Filed: Nov. 5, 2003

(86) PCT No.: PCT/FR03/03300

§ 371 (c)(1),
(2), (4) Date: Oct. 4, 2005

(87) PCT Pub. No.: WO2004/044022

PCT Pub. Date: May 27, 2004

(65) Prior Publication Data

US 2006/0106186 A1      May 18, 2006

(30) Foreign Application Priority Data

Nov. 8, 2002   (FR) .................................. 02 14000

(51) Int. Cl.
*C08G 77/42* (2006.01)
*C08G 77/46* (2006.01)

(52) U.S. Cl. ......................................... 528/25; 528/425
(58) Field of Classification Search ................. 528/425, 528/25

See application file for complete search history.

(56) References Cited

U.S. PATENT DOCUMENTS

| 5,491,209 A | 2/1996 | Helmer et al. |
| 6,413,306 B1 | 7/2002 | Kraiter et al. |

FOREIGN PATENT DOCUMENTS

| EP | 0 639 592 A1 * | 2/1995 |
| FR | 2 810 261 | 12/2001 |
| JP | 06 211951 | 8/1994 |
| JP | 407053645 A * | 2/1995 |
| JP | 407053993 A * | 2/1995 |
| JP | 10 030010 | 2/1998 |
| JP | 411279596 A * | 10/1999 |
| JP | 411279984 A * | 10/1999 |
| JP | 2000 229233 | 8/2000 |

* cited by examiner

Primary Examiner—Robert D. Harlan
(74) Attorney, Agent, or Firm—Oblon, Spivak, McClelland, Maier & Neustadt, L.L.P.

(57) ABSTRACT

The invention relates to a water-soluble copolymer having at least one alkoxy or hydroxyl polyalkylene glycol function grafted onto at least one ethylenically unsaturated monomer, as an agent to improve the activation of the optical brightness of the end product, in the fields of paper, textile, detergents and paint.

6 Claims, No Drawings

USE OF A COPOLYMER HAVING AT LEAST ONE GRAFTED ALKOXY OR HYDROXY POLYALKYLENE GLYCOL FUNCTION AS AN AGENT FOR IMPROVING OPTICAL BRIGHTENING ACTIVATION, AND PRODUCTS OBTAINED

The present invention relates to the technical sector of paper, textile, detergents, paint, and, in particular, the field of fillers and paper coating colours, with a view to improving the activation of optical brightness at the level of the end product.

The invention first of all relates to the use of a water-soluble copolymer having at least one alkoxy or hydroxy polyalkylene glycol function grafted onto at least one ethylenically unsaturated monomer, as agent improving the activation of the optical brightness of the end product.

The invention also relates to the agent improving the activation of the optical brightness of the end product.

The invention also relates to the use of a water-soluble copolymer having at least one alkoxy or hydroxy polyalkylene glycol function grafted onto at least one ethylenically unsaturated monomer, as agent designed to improve the activation of the optical brightness of the end product, and implemented in a dispersion method of pigments and/or mineral fillers in aqueous suspension. It also relates to the dispersion method that implements said copolymer and the aqueous suspensions thus obtained.

It also relates to the use of said aqueous suspensions for the manufacture of fillers and/or coating colours. It also relates to the coating colours and fillers thus obtained. Finally, it relates to the use of said fillers and said coating colours for manufacturing and/or coating the papers. It also relates to the papers thus obtained.

The invention also relates to the use of a water-soluble copolymer having at least one alkoxy or hydroxy polyalkylene glycol function grafted onto at least one ethylenically unsaturated monomer, as agent improving the activation of the optical brightness of the end product, and implemented in grinding fillers and/or mineral pigments in aqueous suspension. It also relates to the grinding method that implements said copolymer and the aqueous suspensions thus obtained.

It also relates to the use of said aqueous suspensions for the manufacture of fillers and/or coating colours. It also relates to the coating colours and fillers thus obtained. Finally, it relates to the use of said fillers and said coating colours for manufacturing and/or coating the papers. It also relates to the papers thus obtained.

The invention also relates to the use of a water-soluble copolymer having at least one alkoxy or hydroxy polyalkylene glycol function grafted onto at least one ethylenically unsaturated monomer, as agent improving the activation of the optical brightness of the end product, and implemented in a filler manufacturing method. It also relates to the filler manufacturing method that implements said copolymer and the fillers thus obtained. It also relates to the use of said fillers for the manufacture of coating colours. Finally, it relates to the papers thus obtained.

The invention also relates to the use of a water-soluble copolymer having at least one alkoxy or hydroxy polyalkylene glycol function grafted onto at least one ethylenically unsaturated monomer, as agent improving the activation of the optical brightness of the end product, and implemented in a coating colour manufacturing method. It also relates to the coating colour manufacturing method that implements said copolymer and the coating colours thus obtained. It also relates to the use of the coating colours thus obtained for coating the papers. Finally, it relates to the papers thus obtained.

Moreover, the invention relates to the use of water-soluble copolymers according to the invention as additives in the manufacture of suspensions of previously dispersed and/or ground mineral matter. It also relates to the use of the suspensions thus obtained in the manufacture of paper coating colours.

Finally, the invention relates to the use of water-soluble copolymers according to the invention as additives to improve the activation of optical brightness in textile, detergent or paint compositions and also relates to the textile, detergent or paint compositions that contain them.

The paper manufacturing method comprises several stages, including: the slurrying of the pigments and/or mineral fillers; the use of said suspensions or slurries to manufacture fillers and/or coating colours; the use of said coating colours and said fillers to manufacture and/or coat the papers. Throughout this method, the skilled man in the art will keep in mind the need to obtain a final product presenting a strong activation of optical brightness, and, consequently, to obtain as white a colour as possible; the increase in the degree of whiteness of the end product is a matter of major concern to the paper manufacturers. This property of activating the optical brightness, together with the known means for enhancing said brightness during the course of the method described above, are subsequently illustrated via documents accessible to the skilled man in the art in the prior art.

During the course of said method, the mineral fillers and/or pigments, such as calcium carbonate, dolomites, kaolin, talc, gypsum, titanium oxide, satin white or aluminium trihydroxide, are initially slurried, alone or in mixtures. To do this, use is made of dispersing and/or grinding aid agents of these pigments and/or mineral fillers still referred to as mineral matter.

It is to be noted that, throughout the description, we speak of mineral matter, fillers and/or pigments, as these terms have the same meaning for the Applicant.

These dispersing and/or grinding aid agents behave as rheology modifiers in so far as they fluidify the suspensions. The mechanical action of grinding, facilitated by the use of grinding agents, also contributes to reducing the size of the particles. Use can also be made of additives that make it possible to regulate the viscosity of said suspensions of mineral matter.

Thus, the skilled man in the art knows document EP 0 610 534 which describes how to prepare polymers obtained by the copolymerization of an isocyanate monomer and aprotic monomers and by functionization using glycol polyalkylene monoalkyl amines or ethers. Such agents are particularly effective for grinding organic pigments.

He also knows document WO 00/77058 which describes copolymers based on an unsaturated derivative of a mono- or dicarboxylic acid, of an unsaturated derivative of polyalkylene glycol, of an unsaturated polysiloxane compound or of an unsaturated ester. These copolymers are used as dispersing agents in mineral filler suspensions, notably in the cement industry.

He also knows document WO 01/96007 which describes an ionic, water-soluble copolymer, having a grafted alkoxy or hydroxy polyalkylene glycol function, the role of which is to disperse and/or facilitate the grinding of the pigments and/or mineral fillers.

Similarly, the skilled man in the art knows document FR 2 707 182 which explains how to use a polymeric compound based on polyacrylic acid salts and phosphonates to fluidify suspensions of inorganic pigments.

However, neither these documents, nor the others that appear in the prior art, teach that the grafting of an alkoxy or hydroxy polyalkylene glycol group improves the activation of the optical brightness.

Said aqueous suspensions of pigments and/or of mineral fillers then enter into the composition of the fillers and/or coating colours.

In the case of fillers, said fillers are added to the fibres before manufacture of the paper sheet; we speak of fillers added to the mass, or fillers, during the manufacture of the fibrous suspension which feeds the paper machine, as indicated in document WO 99/42657. Said fillers can be added to the fibres in the form of suspensions of pigments and/or of mineral fillers. Optical brighteners can also be added to the fibres. These are fluorescent substances "added to the detergents or used to treat textiles or papers, in order to increase their whiteness" (A Dictionary of Science, Oxford University Press, Market House Books 1999), this whiteness being a matter of fundamental importance for the end user. Optical brighteners are generally stylbenic molecules having the property of absorbing part of the luminous radiation in the UV wavelengths, in order to re-emit it in the visible spectrum, thus improving the whiteness of the end product. This whiteness is characterized by the diffuse reflectance factors of the paper for a wavelength of 457 nm, measured with and without UV, noted respectively $R_{457+UV}$ and $R_{457-UV}$; the difference $\Delta UV=R_{457+UV}-R_{457-UV}$ is then calculated. These factors are measured according to French standard NF Q 03-039 using a spectrocolorimeter which meets the specifications of experimental standard NF Q 03-038. The whiteness can also be characterized by the factor W(CIE) measured in accordance with standard ISO/FDIS 11475.

In the case of coating colours, said coating colours are made by adding a certain number of additives to the aqueous suspensions of pigments and/or of mineral fillers. Use is made in particular of latexes which act as binders, and of optical brightness agents. Finally, it is possible to add to these substances compounds known as "carriers" or "activators" of optical brighteners, in the sense that they develop the activity of said brighteners, thus improving the whiteness of the end product.

In this manner, in order to activate the optical brightness, a well known approach is to incorporate, in the paper coating colours a certain number of compounds such as, for example polyvinyl alcohol (PVA), carboxymethylcellulose (CMC), polyvinylpyrrolidone (PVP), casein or starch, which are described in the document "Optical Brightening of Coated Papers" (Allg. Papier-Rundschau, Nov. 5, 1982, No. 44, p. 1242.). Similarly, the document "Effect of Polyethylene Glycols on the Properties of Coating Colors and Coating Quality" (Wochbl. Papierfabr., Feb. 15, 1978, Vol. 106, No. 3, pp. 109-112.) teaches the skilled man in the art how to use polyethylene glycol as carrier for optical brightness in paper coating colours.

The skilled man in the art also knows document JP 60 134096 which describes how to coat papers using a coating colour containing an acrylic or styrene-butadiene copolymer based latex binder, fillers such as, for example calcium carbonate, chalk, talc, kaolin, or a stylbenic or polyethylene glycol compound. This enhances the whiteness of the papers. Finally, the skilled man in the art knows document EP 1 001 083 which describes a polymeric composition containing at least one polyvinyl alcohol and at least one water-soluble polymer at neutral or alkaline pH, used in paper coating colours to improve water retention and activate the optical brightness of the end product.

Pursuing its research with a view to increasing the activation of the optical brightness of papers, the Applicant has surprisingly found that the use in pigment and/or mineral filler grinding methods, in pigment and/or mineral filler dispersion methods, in filler manufacturing methods, in coating colour manufacturing methods, of a water-soluble copolymer having at least one grafted alkoxy or hydroxy polyalkylene glycol function on at least one ethylenically unsaturated monomer, made it possible to improve the activation of the optical brightness of the papers, thereby improving the whiteness of the end product.

In this way, the use according to the invention of a water-soluble copolymer as optical brightness activator is characterized in that the copolymer has at least one alkoxy or hydroxy polyalkylene glycol function grafted onto at least one ethylenically unsaturated monomer.

More specifically, the Applicant found that the presence in said copolymer of at least one monomer of formula (I):

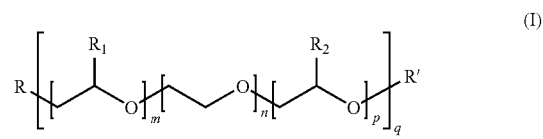

where
  m and p represent a number of alkylene oxide units less than or equal to 150
  n represents a number of ethylene oxide units less than or equal to 150
  q represents an integer equal to at least 1 and such that $5 \leq (m+n+p)q \leq 150$,
  $R_1$ represents hydrogen or the methyl or ethyl radical
  $R_2$ represents hydrogen or the methyl or ethyl radical
  R represents a radical containing a polymerizable unsaturated function, preferably belonging to the vinyl group and to the group of acrylic, methacrylic, maleic, itaconic, crotonic, and vinylphtalic esters and to the group of urethane unsaturates such as acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
  R' represents hydrogen or a hydrocarbon radical having from 1 to 40 carbon atoms, made it possible to develop copolymers having at least one alkoxy or hydroxy polyalkylene glycol function grafted onto at least one ethylenically unsaturated monomer, thereby improving the activation of the optical brightness of the papers.

Thus, according to the invention, said water-soluble copolymer comprises:
  a) at least one anionic monomer with a carboxylic or dicarboxylic or phosphoric or phosphonic or sulfonic function or a mixture thereof,
  b) at least one non-ionic monomer, the non-ionic monomer consisting of at least one monomer of formula (I):

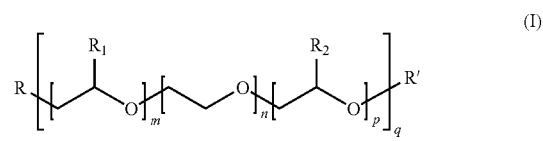

where
  m and p represent a number of allylene oxide units less than or equal to 150
  n represents a number of ethylene oxide units less than or equal to 150 q represents an integer equal to at least 1 and such that $5 \leq (m+n+p)q \leq 150$, and preferably such that $15 \leq (m+n+p)q \leq 120$, $R_1$ represents hydrogen or the methyl or ethyl radical, $R_2$ represents hydrogen or the methyl or ethyl radical, R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, $\alpha$-$\alpha'$ dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) possibly, at least one monomer of the acrylamide or methacrylamide type or their derivatives such as N-[3-(dimethylamino) propyl]acrylamide or N-[3-(dimethylamino) propyl]methacrylamide, and mixtures thereof, or at least one non water-soluble monomer such as the alkyl acrylates or methacrylates, unsaturated esters such as N-[2-(dimethylamino) ethyl]methacrylate, or N-[2-(dimethylamino) ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulfate, [2-(acryloyloxy) ethyl]trimethyl ammonium chloride or sulfate, [3-(acrylamido) propyl]trimethyl ammonium chloride or sulfate, dimethyl diallyl ammonium chloride or sulfate, [3-(methacrylamido) propyl]trimethyl ammonium chloride or sulfate, or at least one organofluorinated or organosilylated monomer, or a mixture of several of these monomers, d) possibly at least one monomer having at least two ethylenic insaturations referred to as the crosslinking monomer in the rest of the application, the total of the proportions of components a), b), c) and d) being equal to 100%.

Said copolymer brought about an improvement in the activation of the optical brightness of the papers.

This goal is attained thanks to the use of a water-soluble copolymer comprising:

a) at least one ethylenically unsaturated anionic monomer with a monocarboxylic or dicarboxylic or sulfonic or phosphoric or phosphonic function or a mixture thereof, b) at least one non-ionic monomer of formula (I), c) possibly, at least one monomer of the acrylamide or methacrylamide type or their derivatives such as N-[3-(dimethylamino) propyl]acrylamide or N-[3-(dimethylamino) propyl]methacrylamide, and mixtures thereof, or at least one non water-soluble monomer such as the alkyl acrylates or methacrylates, unsaturated esters such as N-[2-(dimethylamino) ethyl]methacrylate, or N-[2-(dimethylamino) ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulfate, [2-(acryloyloxy) ethyl]trimethyl ammonium chloride or sulfate, [3-(acrylamido) propyl]trimethyl ammonium chloride or sulfate, dimethyl diallyl ammonium chloride or sulfate, [3-(methacrylamido) propyl]trimethyl ammonium chloride or sulfate, or at least one organofluorinated or organosilylated monomer, or a mixture of several of these monomers, d) possibly, at least one crosslinking monomer, the total of the proportions of components a), b), c) and d) being equal to 100%.

The use, according to the invention, of a water-soluble copolymer, having at least one alkoxy or hydroxy polyalkylene glycol function grafted onto at least one ethylenically unsaturated monomer leading to an improvement in the activation of the optical brightness of the papers, is characterized in that said water-soluble copolymer consists of:

a) at least one ethylenically unsaturated anionic monomer having a monocarboxylic function selected from among the ethylenically unsaturated monomers having a monocarboxylic function such as acrylic or methacrylic acid or hemiesters of diacids such as $C_1$ to $C_4$ monoesters of maleic or itaconic acid, or mixtures thereof, or selected from among the ethylenically unsaturated monomers having a dicarboxylic function such as crotonic, isocrotonic, cinnamic, itaconic, maleic acid, or anhydrides of carboxylic acids, such as maleic anhydride or selected from among the ethylenically unsaturated monomers having a sulfonic function such as acrylamido-methyl-propane-sulfonic acid, sodium methallylsulfonate, vinylsulfonic acid and styrenesulfonic acid or selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or selected from among the ethylenically unsaturated monomers having a phosphonic function such as vinylphosphonic acid, or mixtures thereof, b) at least one non-ionic ethylenically unsaturated monomer of formula (I):

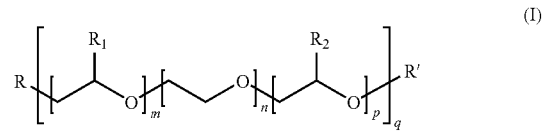

where m and p represent a number of alkylene oxide units less than or equal to 150 n represents a number of ethylene oxide units less than or equal to 150 q represents an integer equal to at least 1 and such that $5 \leq (m+n+p)q \leq 150$, and preferably such that $15 \leq (m+n+p)q \leq 120$, $R_1$ represents hydrogen or the methyl or ethyl radical, $R_2$ represents hydrogen or the methyl or ethyl radical, R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, $\alpha$-$\alpha'$ dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) possibly, at least one monomer of the acrylamide or methacrylamide type or their derivatives such as N-[3-(dimethylamino) propyl]acrylamide or N-[3-(dimethylamino) propyl]methacrylamide, and mixtures thereof, or at least one non water-soluble monomer such as the alkyl acrylates or methacrylates, unsaturated esters such as N-[2-(dimethylamino) ethyl]methacrylate, or N-[2-(dimethylamino) ethyl]acrylate, vinyls such as vinyl acetate, vinylpyrrolidone, styrene, alphamethylstyrene and their derivatives, or at least one cationic monomer or quaternary ammonium such as [2-(methacryloyloxy) ethyl]trimethyl ammonium chloride or sulfate, [2-(acryloyloxy) ethyl]trimethyl ammonium chloride or sulfate, [3-(acrylamido) propyl]trimethyl ammonium chloride or sulfate, dimethyl diallyl ammonium chloride or sulfate, [3-(methacrylamido) propyl]trimethyl ammonium chloride or sulfate, or at least one organofluorinated or at least one organosilylated monomer, selected preferably from among molecules of formula (IIa) or (IIb), with formula (IIa)

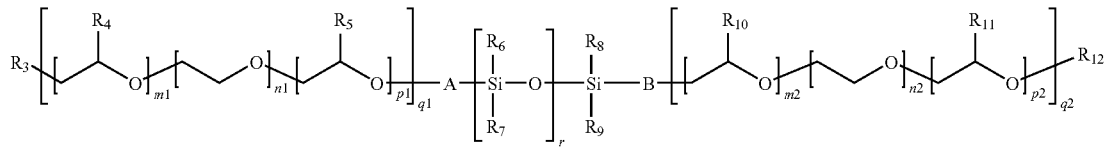

where
- $m_1$, $p_1$, $m_2$ and $p_2$ represent a number of alkylene oxide units less than or equal to 150
- $n_1$ and $n_2$ represent a number of ethylene oxide units less than or equal to 150
- $q_1$ and $q_2$ represent an integer equal to at least 1 and such that $0 \leq (m_1+n_1+p_1)q_1 \leq 150$ and $0 \leq (m_2+n_2+p_2)q_2 \leq 150$,
- r represents a number such that $1 \leq r \leq 200$
- $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent straight or branched alkyl, aryl, alkylaryl or arylalkyl groups having from 1 to 20 carbon atoms, or a mixture thereof,
- $R_{12}$ represents a hydrocarbon radical having from 1 to 40 carbon atoms,
- A and B are groups which may be present, in which case they represent a hydrocarbon radical having from 1 to 4 carbon atoms, with formula (IIb)

$$R\text{-}A\text{-}Si(OB)_3$$

where
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- A is a group which may be present, in which case it represents a hydrocarbon radical having from 1 to 4 carbon atoms
- B represents a hydrocarbon radical having from 1 to 4 carbon atoms or a mixture of several of said monomers, d) possibly, at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others, or selected from the molecules of formula (III):

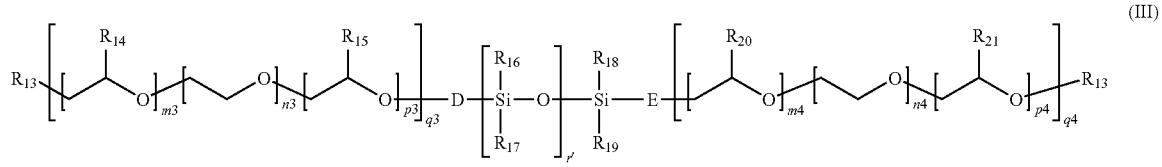

(III)

where
- $m_3$, $p_3$, $m_4$ and $p_4$ represent a number of alkylene oxide units less than or equal to 150, $n_3$ and $n_4$ represent a number of ethylene oxide units less than or equal to 150, $q_3$ and $q_4$ represent an integer equal to at least 1 and such that $0 \leq (m_3+n_3+p_3)q_3 \leq 150$ and $0 \leq (m_4+n_4+p_4)q_4 \leq 150$, r' represents a number such that $1 \leq r' \leq 200$, $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}$, $R_{15}$, $R_{20}$ and $R_{21}$ represent hydrogen or the methyl or ethyl radical, $R_{16}$, $R_{17}$, $R_{18}$ and $R_{19}$ represent straight or branched alkyl, aryl, alkylaryl or arylalkyl groups having from 1 to 20 carbon atoms, or a mixture thereof, D and E are groups which may be present, in which case they represent a hydrocarbon radical having from 1 to 4 carbon atoms, or a mixture of several of said monomers, the total of the proportions of components a), b), c) and d) being equal to 100%.

More particularly, the use of the above-mentioned copolymer is characterized in that said water-soluble copolymer consists, in terms of weight, of:

a) from 2% to 95%, and more particularly from 5% to 90% of at least one ethylenically unsaturated anionic monomer having a monocarboxylic function selected from among the ethylenically unsaturated monomers having a monocarboxylic function such as acrylic or methacrylic acid or hemiesters of diacids such as $C_1$ to $C_4$ monoesters of maleic or itaconic acid, or mixtures thereof, or selected from among the ethylenically unsaturated monomers having a dicarboxylic function such as crotonic, isocrotonic, cinnamic, itaconic, maleic acid, or anhydrides of carboxylic acids, such as maleic anhydride or selected from among the ethylenically unsaturated monomers having a sulfonic function such as acrylamido-methyl-propane-sulfonic acid, sodium methallylsulfonate, vinylsulfonic acid and styrene-sulfonic acid or selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or selected from among the ethylenically unsaturated monomers having a phosphonic function such as vinylphosphonic acid, or mixtures thereof, b) from 2 to 95% and, more particularly, from 5% to 90%, of at least one non-ionic ethylenically unsaturated monomer of formula (I):

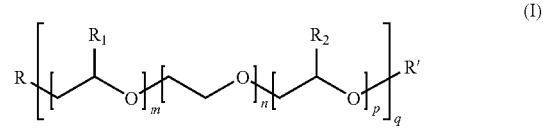

where
m and p represent a number of alkylene oxide units less than or equal to 150, n represents a number of ethylene oxide units less than or equal to 150, q represents an integer equal to at least 1 and such that $5 \leq (m+n+p)q \leq 150$, and preferably such that $15 \leq (m+n+p)q \leq 120$, $R_1$ represents hydrogen or the methyl or ethyl radical $R_2$ represents hydrogen or the methyl or ethyl radical R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) from 0% to 50% of at least one monomer of the acrylamide or methacrylamide type or their derivatives such as N-[3-(dimethylamino) propyl]acrylamide or N-[3-(dimethylamino) propyl]methacrylamide, and mixtures thereof, or at least one non water-soluble monomer such as the alkyl acrylates or methacrylates, unsaturated esters such as N-[2-(dimethylamino) ethyl]methacrylate, or N-[2-(dimethylamino) ethyl]acrylate, vinyls such as vinyl acetate, vinylpyrrolidone, styrene, alpha-methylstyrene and their derivatives, or at least one cationic monomer or quaternary ammonium such as [2-(methacryloyloxy) ethyl]trimethyl ammonium chloride or sulfate, [2-(acryloyloxy) ethyl]trimethyl ammonium chloride or sulfate, [3-(acrylamido) propyl]trimethyl ammonium chloride or sulfate, dimethyl diallyl ammonium chloride or sulfate, [3-(methacrylamido) propyl] trimethyl ammonium chloride or sulfate, or an organofluorinated monomer or a organosilylated monomer, selected preferably from among the molecules of formula (IIa) or (IIb), with formula (IIa)

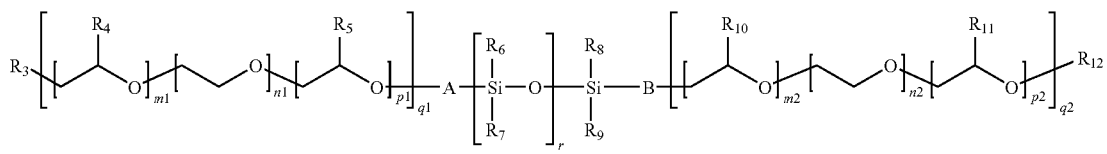

where
- $m_1$, $p_1$, $m_2$ and $p_2$ represent a number of alkylene oxide units less than or equal to 150,
- $n_1$ and $n_2$ represent a number of ethylene oxide units less than or equal to 150, ene-bis-acrylamide, methylene-bis-methacrylamide, tetrallyloxyethane, triallylcyanurates, allyl ethers prepared from polyols such as pentaerythritol, sorbitol, sucrose or others from among the molecules of formula (III):

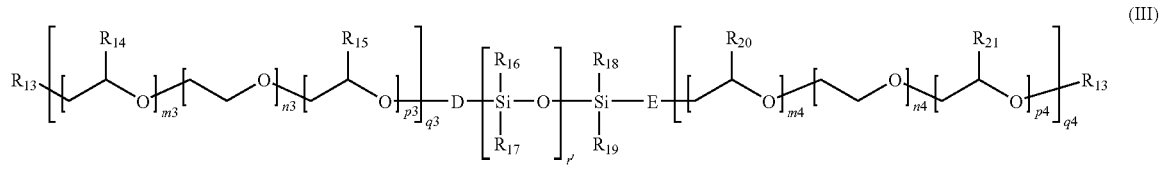

- $q_1$ and $q_2$ represent an integer equal to at least 1 and such that $0 \leq (m_1+n_1+p_1)q_1 \leq 150$ and $0 \leq (m_2+n_2+p_2)q_2 \leq 150$,
- r represents a number such that $1 \leq r \leq 200$,
- $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent straight or branched alkyl, aryl, alkylaryl or arylalkyl groups having from 1 to 20 carbon atoms, or a mixture thereof,
- $R_{12}$ represents a hydrocarbon radical having from 1 to 40 carbon atoms,
- A and B are groups which may be present, in which case they represent a hydrocarbon radical having from 1 to 4 carbon atoms, with formula (IIb)

R-A-Si(OB)$_3$ where
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- A is a group which may be present, in which case it represents a hydrocarbon radical having from 1 to 4 carbon atoms,
- B represents a hydrocarbon radical having from 1 to 4 carbon atoms,
- or a mixture of several of said monomers, d) from 0% to 3% of at least one crosslinking monomer selected, but not exclusively, from the group consisting of ethylene glycol dimethacrylate, trimethylolpropanetriacrylate, allyl acrylate, the allyl maleates, methylwhere
- $m_3$, $p_3$, $m_4$ and $p_4$ represent a number of alkylene oxide units less than or equal to 150,
- $n_3$ and $n_4$ represent a number of ethylene oxide units less than or equal to 150,
- $q_3$ and $q_4$ represent an integer equal to at least 1 and such that $0 \leq (m_3+n_3+p_3)q_3 \leq 150$ and $0 \leq (m_4+n_4+p_4)q_4 \leq 150$,
- r' represents a number such that $1 \leq r' \leq 200$,
- $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof,
- D and E are groups which may be present, in which case they represent a hydrocarbon radical having from 1 to 4 carbon atoms,
- or a mixture of several of said monomers, the total of the proportions of components a), b), c) and d) being equal to 100%.

The copolymer used according to the invention is obtained by known radical copolymerization methods in solution, in direct or inverse emulsion, in suspension or precipitation in appropriate solvents, in the presence of known catalytic systems and transfer agents, or by means of controlled radical polymerization methods such as the method known as Reversible Addition Fragmentation Transfer (RAFT), the method known as Atom Transfer Radical Polymerization (ATRP), the method known as Nitroxide Mediated Polymerization (NMP), or the method known as Cobaloxime Mediated Free Radical Polymerization.

This copolymer obtained in acid form and possibly distilled may also be fully or partially neutralized by one or more neutralization agents having a monovalent neutralizing function or a polyvalent neutralizing function such as, for example, for the monovalent function those selected from the group consisting of the alkaline cations, in particular sodium, potassium, lithium, ammonium or the primary, secondary or tertiary aliphatic and/or cyclic amines such as for example stearylamine, the ethanolamines (mono-, di-, triethanolamine), mono and diethylamine, cyclohexylamine, methylcyclohexylamine, aminomethylpropanol, morpholine or, for the polyvalent function those selected from the group consisting of alkaline earth divalent cations, in particular magnesium and calcium, or zinc, and of the trivalent cations, including in particular aluminium, or of certain cations of higher valency. Each neutralization agent then operates according to neutralization rates proper to each valency function.

According to another variant, the copolymer obtained from the copolymerization reaction may, before or after the total or partial neutralization reaction, be treated and separated into several phases, according to statistical or dynamic methods known to the skilled man in the art, by one or more polar solvents belonging to the group consisting of water, methanol, ethanol, propanol, isopropanol, butanols, acetone, tetrahydrofurane or mixtures thereof.

One of the phases then corresponds to the copolymer used according to the invention as agent whose role is to improve the activation of the optical brightness of the paper.

The invention also relates to said copolymer having at least one alkoxy or hydroxy polyalkylene glycol function grafted onto at least one ethylenically unsaturated monomer, by means of which it is possible to improve the activation of the optical brightness of the papers, detergents, textiles and paints.

Thus, according to the invention, the agent whose role it is to improve the activation of the optical brightness is characterized in that it is the above-mentioned water-soluble copolymer.

The specific viscosity of the copolymer is symbolized by the symbol $\eta_{spe}$ and is determined as follows.

A solution of polymerizate is taken so as to obtain a solution corresponding to 2.5 g of dry polymer neutralized with soda and 50 ml of demineralised water. Then, using a capillary viscometer of Baume constant equal to 0.000105 placed in a thermostat controlled bath at 25° C., we measure the runoff time of a given volume of the above-mentioned solution containing the copolymer, and the runoff time of the same volume of demineralized water without said copolymer. It is then possible to define the specific viscosity $\eta_{spe}$ thanks to the following relation:

$$\eta_{spe} = \frac{\text{(runoff time of solution of polymer)} - \text{(runoff time of demineralized water)}}{\text{runoff time of demineralized water}}$$

The capillary tube is generally selected in such a way that the runoff time of the pure demineralized water is approximately 60 to 100 seconds, thus giving highly accurate specific viscosity measurements.

The invention also relates to the dispersion method that implements said copolymer.

This dispersion method according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 3% by dry weight of said copolymer with respect to the dry weight of the fillers and/or pigments.

This dispersion method in aqueous suspension of mineral matter according to the invention is characterized in that the mineral matter is selected from among calcium carbonate, dolomites, kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures, and consists more particularly of calcium carbonate such as natural calcium carbonate selected from among marble, calcite, chalk or mixtures thereof.

The invention also relates to the grinding method that implements said copolymer.

This grinding method in aqueous suspension of mineral matter according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 3% by dry weight of said copolymer with respect to the dry weight of the fillers and/or pigments.

This grinding method in aqueous suspension of mineral matter according to the invention is characterized in that the mineral matter is selected from among calcium carbonate, dolomites, kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures, and consists more particularly of calcium carbonate such as natural calcium carbonate selected from among marble, calcite, chalk or mixtures thereof.

The invention also relates to the filler manufacturing method that implements said copolymer.

This filler manufacturing method according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 1% by dry weight of said copolymer with respect to the dry weight of the fillers and/or pigments.

The invention also relates to the coating colour manufacturing method that implements said copolymer.

This coating colour manufacturing method according to the invention is characterized in that use is made of said copolymer, and, in particular, in that use is made of 0.05% to 5% by dry weight of said copolymer with respect to the dry weight of the fillers and/or pigments, and, more particularly, in that use is made of 0.1% to 3% by dry weight of said copolymer with respect to the dry weight of the fillers and/or pigments. The aqueous suspensions of fillers and/or pigments still referred to as mineral matter, dispersed, and/or ground, and/or with additives of the copolymer according to the invention, are characterized in that they contain said copolymer and more particularly in that they contain from 0.05% to 5% by dry weight of said copolymer with respect to the total dry weight of the fillers and/or pigments, and yet more particularly 0.1% to 3.0% by dry weight of said copolymer with respect to the dry weight of the fillers and/or pigments.

They are also characterized in that the filler and/or pigment is selected from among calcium carbonate, dolomites, kaolin, talc, gypsum, titanium oxide, satin white or aluminium trihydroxide, mica and the mixture of these fillers, such as talc-calcium carbonate or calcium carbonate-kaolin mixtures, or mixtures of calcium carbonate with aluminium trihydroxide, or mixtures with synthetic or natural fibres or co-structures of minerals such as talc-calcium carbonate or talc-titanium dioxide co-structures, or any other filler and/or pigment habitually implemented in the paper industry and mixtures thereof.

Preferably, the aqueous suspensions of mineral matter according to the invention are characterized in that the mineral matter is calcium carbonate such as natural calcium carbonate selected from among marble, calcite, chalk or mixtures thereof.

The fillers according to the invention are characterized in that they contain said copolymer and more particularly in that they contain 0.05% to 5% by dry weight of said copolymer with respect to the total dry weight of the fillers and/or pigments, and more particularly still 0.1% to 1% by dry weight of said copolymer with respect to the total dry weight of the fillers and/or pigments.

The coating colours according to the invention are characterized in that they contain said copolymer and more particularly in that they contain 0.05% to 5% by dry weight of said copolymer with respect to the total dry weight of the fillers and/or pigments, and more particularly still 0.1% to 2% by dry weight of said copolymer with respect to the total dry weight of the fillers and/or pigments.

The manufactured and/or coated papers according to the invention are characterized in that they contain said copolymer.

The textile compositions according to the invention are characterized in that they contain said copolymer.

The detergent compositions according to the invention are characterized in that they contain said copolymer.

The paint compositions according to the invention are characterized in that they contain said copolymer.

The scope and interest of the invention will be better perceived thanks to the following examples which are not of a comprehensive nature.

EXAMPLE 1

This example relates to the use of copolymers according to the invention in a mineral filler dispersion method. It also relates to the use of the suspensions thus obtained in the manufacture of coating colours, said coating colours being used to coat papers. This example also relates to measurements of the optical brightness and whiteness of the papers thus obtained. More precisely, the aim of this example is to demonstrate the efficiency of a water-soluble copolymer according to the invention containing at least one alkoxy or hydroxy polyalkylene glycol function grafted onto at least one ethylenically unsaturated monomer, as compared with polymers of the prior art that lack this grafted function.

In the tests corresponding to this example, the first step is to disperse a suspension of mineral matter, in accordance with one of the methods familiar to the skilled man in the art.

The Brookfield™ viscosity of said suspensions is determined as follows.

The Brookfield™ viscosity of the suspension is measured using a model RVT Brookfield™ viscometer, in the unstirred beaker, at a temperature of 23° C. and two speeds of rotation of 10 and 100 rpm with the appropriate spindle. The reading is taken after 1 minute of rotation. This gives 2 Brookfield™ viscosity measurements respectively noted $\mu_{10}$ and $\mu_{100}$.

Having left this sample lie in the beaker for 8 days, the Brookfield™ viscosity of the suspension is measured by introducing the appropriate spindle of the RVT model Brookfield™ viscometer into the unstirred beaker, at a temperature of 23° C. and at 2 speeds of rotation of 10 and 100 rpm ($\mu_{10}$ and $\mu_{100}$). The reading is taken after 1 minute of rotation (Brookfield™ viscosity before stirring). The same Brookfield™ viscosity measurements ($\mu_{10}$ and $\mu_{100}$) are also made after the beaker has been stirred for 5 minutes (Brookfield™ viscosity after stirring).

Said suspensions then enter into the composition of the coating colours.

In this example, each of the coating colours is prepared by incorporating, for 100 parts by weight of dry pigment of said ground suspension of calcium carbonate, 15 parts by dry weight of styrene-butadiene latex marketed by DOW CHEMICAL under the name DL920™, and 1 part by weight as is of optical brightener marketed by BAYER under the name Blancophor P™.

The initial viscosity of said coating colours can be determined using the same method as that applied to aqueous suspensions of mineral matter.

Said coating colours are used to coat sheets of support board manufactured by CASCADES LA ROCHETTE, the whiteness of which is characterized by the parameters $R_{457+UV}$, $R_{457-UV}$, $\Delta UV$ and $W(CIE)$ respectively equal to 70.3–70.0–0.3 and 49.4. Each coating test uses a 21×29.7 cm sheet of board with a specific weight of 223 g/m² which is coated with the coating colour to be tested. Said coating is performed using a laboratory coater with interchangeable rollers marketed by ERICHSEN under the name Mod. KCC 202™. Each board sheet is thus coated to 21 g/m² and then dried in a non-ventilated oven for 5 minutes at 50° C.

Test No. 1

This test illustrates the prior art and implements 0.75% by dry weight, measured with respect to the dry weight of mineral filler of a copolymer according to the prior art to disperse a suspension of calcium carbonate, of which 75% by weight of the particles have a diameter of less than 1 μm determined using a Sedigraph™ 5100 grain size analyzer, having a dry matter content of 72%.

Said copolymer consists (by weight) of 70% acrylic acid and 30% maleic anhydride. It has a specific viscosity of 1.4 and is neutralized by means of soda.

Test No. 2

This test illustrates the invention and implements 0.75% by dry weight, measured with respect to the dry weight of mineral filler of a copolymer according to the invention to disperse a suspension of calcium carbonate, of which 75% by weight of the particles have a diameter of less than 1 μm determined using a Sedigraph™ 5100 grain size analyzer, having a dry matter content of 72%.

Said copolymer, which has a specific viscosity of 1.2 is neutralized by potash and consists of:
a) 13.5% acrylic acid and 3.5% methacrylic acid
b) 83% of a monomer of formula (I) in which:
 $R_1$ represents hydrogen
 $R_2$ represents hydrogen
 R represents the methacrylate group
 R' represents the methyl radical
 with $(m+n+p)q=45$ For tests No. 1 and 2, the dry matter content of the coating colours, their pH, and the Brookfield™ viscosities are determined at 10 and 100 rpm ($\mu_{10}$ and $\mu_{100}$).

Finally the parameters $R_{457+UV}$ and $R_{457-UV}$ are measured for coated boards according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

The results corresponding to tests No. 1 and 2 are summed up in table I.

TABLE I

| Tests | | Characteristics of coating colours | | | | Whiteness of coated boards | | | |
|---|---|---|---|---|---|---|---|---|---|
| Prior art/ Invention | No. | NVM (%) | pH | $\mu_{10}$ | $\mu_{100}$ | $R_{457+UV}$ | $R_{457-UV}$ | $\Delta UV$ | W (CIE) |
| Prior art | 1 | 64.8 | 8.1 | 1780 | 325 | 88.9 | 83.7 | 5.2 | 92.4 |
| Invention | 2 | 65.1 | 8.1 | 5360 | 860 | 91.6 | 82.9 | 8.7 | 103.9 |

Table I shows that the use of the copolymer according to the invention containing a grafted methoxypolyethylene glycol methacrylate function of molecular weight 2000, as indicated in test No. 2 via the description of the monomer b), makes a significant improvement to the activation of the optical brightness and the whiteness of the coated boards.

Furthermore, it is noted that the Brookfield™ viscosities of the coating colours obtained according to the invention are compatible with the normal industrial application.

EXAMPLE 2

This example relates to the use of copolymers according to the invention in a mineral filler grinding method. It also relates to the use of the suspensions thus obtained in the manufacture of coating colours, said coating colours being used to coat papers. This example also relates to measurements of the optical brightness and whiteness of the papers thus obtained. Finally, the aim of this example is to illustrate the influence of the rate of monomer b) on the whiteness of the coated papers.

In the tests corresponding to this example, the first step is to grind a suspension of mineral matter, in accordance with the following method.

Use is made of a Dyno-Mill™ type fixed-cylinder grinder with rotating impeller, the grinding body consisting of zirconium based beads with a diameter between 0.6 millimeters and 1 millimeter.

The total volume occupied by the grinding body is 1000 cubic centimeters while its mass is 2700 g.

The grinding chamber has a volume of 1400 cubic centimeters.

The circumferential speed of the grinder is 10 meters per second.

The pigment suspension is recycled at a rate of 40 liters per hour.

The output of the Dyno-Mill™ is fitted with a 200-micron grade separator by means of which it is possible to separate the suspension resulting from the grinding and the grinding body.

The temperature during each grinding test is maintained at approximately 60° C.

The granulometry of said suspensions is determined as follows.

One hour after grinding is completed, a sample of the pigmentary suspension the granulometry of which (expressed in % weight of the particles less than 2 micrometers) is measured using a Sedigraph™ 5100 particle size analyzer is recovered in a beaker.

The Brookfield™ viscosity of said suspensions is determined in accordance with the method described in example 1.

Said suspensions then enter into the composition of the coating colours.

In this example, each of the coating colours is prepared by incorporating, for 100 parts by weight of dry pigment of said ground suspension of calcium carbonate, 10 parts by dry weight of styrene-butadiene latex marketed by DOW CHEMICAL under the name DL920™, and 1 part by weight as is of optical brightener marketed by BAYER under the name Blancophor P™.

Said coating colours are used to coat precoated sheets of paper. Their whiteness is characterized by the parameters $R_{457+UV}$, $R_{457-UV}$, $\Delta UV$ and W(CIE) respectively equal to 88.4–85.8–2.6 and 89.5.

Each coating test uses a 21×29.7 cm sheet with a specific weight of 96 g/m² which is coated with the coating colour to be tested. Said coating is performed using a laboratory coater with interchangeable rollers marketed by ERICHSEN under the name Mod. KCC 202™. Each paper sheet is thus coated to 15 g/m² and then dried in an unaired oven for 5 minutes at 50° C.

Test No. 3

This test illustrates the prior art and implements 0.65% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

This homopolymer of acrylic acid has a specific viscosity of 0.64 and is neutralized by means of calcium and sodium hydroxides.

Test No. 4

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 1.08, is neutralized by soda and consists of:
  a) 89.8% acrylic acid and 0.2% methacrylic acid
  b) 10% of a monomer of formula (I) in which:
    $R_1$ represents hydrogen
    $R_2$ represents hydrogen
    R represents the methacrylate group
    R' represents the methyl radical
    with (m+n+p)q=113

Test No. 5

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.01, is neutralized by soda and consists of:
  a) 79.6% acrylic acid and 0.4% methacrylic acid
  b) 20% of a monomer of formula (I) in which:
    $R_1$ represents hydrogen
    $R_2$ represents hydrogen
    R represents the methacrylate group
    R' represents the methyl radical
    with (m+n+p)q=113

Test No. 6

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.08, is neutralized by soda and consists of:
  a) 69.5% acrylic acid and 0.5% methacrylic acid
  b) 30% of a monomer of formula (I) in which:
    $R_1$ represents hydrogen
    $R_2$ represents hydrogen
    R represents the methacrylate group
    R' represents the methyl radical
    with (m+n+p)q=113

Test No. 7

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.56, is neutralized by soda and consists of:
  a) 8.5% acrylic acid and 1.5% methacrylic acid
  b) 90% of a monomer of formula (I) in which:
    R1 represents hydrogen
    R2 represents hydrogen
    R represents the methacrylate group
    R' represents the methyl radical
    with (m+n+p)q=113

Test No. 8

This test illustrates the prior art and implements 1% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This homopolymer of acrylic acid has a specific viscosity of 0.64 and is neutralized by means of calcium and sodium hydroxides.

Test No. 9

This test illustrates the invention and implements 1% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 0.64, is neutralized by soda and consists of:
  a) 94.5% acrylic acid and 0.5% methacrylic acid
  b) 5% of a monomer of formula (I) in which:
    $R_1$ represents hydrogen
    $R_2$ represents hydrogen
    R represents the methacrylate group
    R' represents the methyl radical
    with (m+n+p)q=113

For all the tests 3 to 9, the dry matter content of the suspensions of mineral matter, their pH, their granulometry characterized by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring. Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 3 to 9 are summed up in table II.

| Tests No. | Prior art/ Invention | Composition of polymer | $\eta_{spe}$ | Dry Mat. Cont. (%) | pH | Grain size % < 2 μm | Grain size % < 1 μm | Brookfield™ viscosities (mPa·s) at t = 0 $\mu_{10}$ | Brookfield™ viscosities (mPa·s) at t = 0 $\mu_{100}$ | Brookfield™ viscosities (mPa·s) at t = 8 days before stirring $\mu_{10}$ | Brookfield™ viscosities (mPa·s) at t = 8 days before stirring $\mu_{100}$ | Brookfield™ viscosities (mPa·s) at t = 8 days after stirring $\mu_{10}$ | Brookfield™ viscosities (mPa·s) at t = 8 days after stirring $\mu_{100}$ | Whiteness $R_{457+UV}$ | Whiteness $R_{457-UV}$ | Δ UV | W (CIE) |
|---|---|---|---|---|---|---|---|---|---|---|---|---|---|---|---|---|---|
| 3 | Prior art | 100% AA | 0.64 | 75.7 | 9.5 | 89.8 | 60.5 | 510 | 200 | 3000 | 800 | 470 | 190 | 91.4 | 85.2 | 6.2 | 95.5 |
| 4 | Invention | 89.8% AA 0.2% AMA 10% M MePEG5000 | 1.08 | 75.9 | 9.9 | 85.9 | 53.3 | 350 | 170 | 2510 | 640 | 450 | 200 | 92.8 | 85.2 | 7.6 | 97.4 |
| 5 | Invention | 79.6% AA 0.4% AMA 20% M MePEG5000 | 1.01 | 76.2 | 9.8 | 90.1 | 60.5 | 1710 | 610 | 20400 | 2720 | 2110 | 700 | 93.1 | 85.1 | 8 | 98.4 |

-continued

| Tests | Composition | Dry Mat. | | Grain size | | Brookfield™ viscosities (mPa·s) | | Brookfield™ viscosities (mPa·s) at t = 8 days before stirring | | Brookfield™ viscosities (mPa·s) at t = 8 days after stirring | | Whiteness | | | |
|---|---|---|---|---|---|---|---|---|---|---|---|---|---|---|---|
| Prior art/ | of | | | % < | % < | at t = 0 | | | | | | | | | W |
| No. Invention | polymer | $\eta_{spe}$ | (%) | pH | 2 μm | 1 μm | $\mu_{10}$ | $\mu_{100}$ | $\mu_{10}$ | $\mu_{100}$ | $\mu_{10}$ | $\mu_{100}$ | $R_{457+UV}$ | $R_{457-UV}$ | ΔUV | (CIE) |
| 6 Invention | 69.5% AA 0.5% AMA 30% M MePEG5000 | 1.08 | 75.3 | 9.9 | 85.7 | 55.5 | 1080 | 410 | 9560 | 1760 | 1170 | 430 | 93.4 | 84.9 | 8.5 | 100.2 |
| 7 Invention | 8.5% AA 1.5% AMA 90% M MePEG5000 | 1.56 | 75.4 | 8.4 | 76.1 | 44.8 | 1880 | 740 | 5000 | 2020 | 1660 | 690 | 92.8 | 85.5 | 7.3 | 101.2 |
| 8 Prior art | 100% AA | 0.64 | 75.8 | 9.6 | 90.4 | 61.3 | 320 | 110 | 1210 | 510 | 400 | 130 | 91.2 | 85.4 | 5.8 | 95.4 |
| 9 Invention | 94.5% AA 0.5% AMA 5% M MePEG5000 | 0.96 | 75.9 | 9.4 | 89.3 | 58.8 | 540 | 220 | 4440 | 1110 | 790 | 340 | 93.2 | 85.3 | 7.9 | 98.0 |

AA designates: acrylic acid
AMA designates: methacrylic acid
M MePEG5000 designates: methoxypolyethylene glycol methacrylate with a molecular weight of 5000

Table II shows that the copolymers according to the invention, used in a mineral filler grinding method, make it possible to significantly improve the activation of the optical brightness of the coated papers, and make a significant improvement to their whiteness, irrespective of the rate of the monomer b) as described in tests No. 4, 5, 6, 7 and 9.

Moreover, these results also demonstrate that the copolymers according to the invention make it possible to obtain suspensions of mineral fillers that can be handled after storage without stirring.

EXAMPLE 3

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, the aim of this example is to illustrate the influence of the length of the grafted alkoxy polyalkylene glycol chain (i.e. the value of (m+n+p)q in formula (I) which enters into the description of the monomer b), and the influence of the chemical nature of the molecule grafting said alkoxy polyalkylene glycol group to the main chain of the polymer.

In this example, the first step is to grind suspensions of mineral matter as per the method described for example 2. Their granulometry and their Brookfield™ viscosity are determined as per the methods described for example 2. Said suspensions then enter into the composition of coating colours formulated as per the method described for example 2. Finally, said coating colours are used to coat paper sheets as per the method described for example 2, with a coating weight equal to 15 g/m². Said sheets are 21×29.7 cm pre-coated paper sheets with a specific weight of 96 g/m². Their whiteness is characterized by the parameters $R_{457+UV}$, $R_{457-UV}$, ΔUV and W(CEE) respectively equal to 88.4–85.8–2.6 and 89.5.

Test No. 10

This test illustrates the prior art and implements 0.65% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This homopolymer of acrylic acid has a specific viscosity of 0.64 and is neutralized by means of calcium and sodium hydroxides.

Test No. 11

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 0.84, is neutralized by soda and consists of:
  a) 18% methacrylic acid
  b) 82% of a monomer of formula (I) in which:
    $R_1$ represents hydrogen
    $R_2$ represents hydrogen
    R represents the methacrylate group
    R' represents the methyl radical
    with (m+n+p)q=8

Test No. 12

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 0.78, is neutralized by soda and consists of:
a) 8.3% acrylic acid and 8.7% methacrylic acid
b) 83% of a monomer of formula (I) in which:
  $R_1$ represents hydrogen
  $R_2$ represents hydrogen
  R represents the methacrylate group
  R' represents the methyl radical
  with $(m+n+p)q=17$ Test No. 13

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.47, is neutralized by soda and consists of:
a) 17% acrylic acid
b) 77.6% of a monomer of formula (I) in which:
  $R_1$ represents hydrogen
  $R_2$ represents hydrogen
  R represents the methacrylurethane group, a product of the reaction of ethylene glycol methacrylate and diisocyanate toluene
  R' represents the methyl radical
  with $(m+n+p)q=113$
c) 5.4% ethyl acrylate Test No. 14

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 3.66, is neutralized by sodium and consists of:
a) 10% methacrylic acid
b) 90% of a monomer of formula (I) in which:
  $R_1$ represents hydrogen
  $R_2$ represents hydrogen
  R represents the 3 isopropenyl α, α dimethylbenzyl urethane group
  R' represents the methyl radical
  with $(m+n+p)q=113$ For all the tests 10 to 14, the dry matter content of the suspensions of mineral matter, their pH, their granulometry identified by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring. Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 10 to 14 are summed up in table III.

| Tests | | Composition | | Dry Mat. | | Grain size | | Brookfield™ viscosities (mPa·s) | | Brookfield™ viscosities (mPa·s) at t = 8 days before stirring | | Brookfield™ viscosities (mPa·s) at t = 8 days after stirring | | Whiteness | | | |
|---|---|---|---|---|---|---|---|---|---|---|---|---|---|---|---|---|---|
| No. | Prior art/ Invention | of polymer | $\eta_{spe}$ | Cont. (%) | pH | % < 2 μm | % < 1 μm | at t = 0 | | | | | | | | | W (CIE) |
| | | | | | | | | $\mu_{10}$ | $\mu_{100}$ | $\mu_{10}$ | $\mu_{100}$ | $\mu_{10}$ | $\mu_{100}$ | $R_{457+UV}$ | $R_{457-UV}$ | Δ UV | |
| 10 | Prior art | 100% AA | 0.64 | 76.0 | 9.4 | 60.2 | 37 | 400 | 140 | 670 | 320 | 330 | 130 | 91.4 | 84.9 | 6.5 | 95.7 |
| 11 | Invention | 18% AMA 82% M MePEG350 | 0.84 | 75.3 | 8.8 | 60.4 | 35.4 | 390 | 290 | 18750 | 2030 | 7540 | 890 | 96.5 | 85.5 | 11 | 110.9 |
| 12 | Invention | 8.3% AA 8.7% AMA 83% M MePEG350 | 0.78 | 75.9 | 9.0 | 60.5 | 32.7 | 190 | 150 | 1440 | 460 | 220 | 160 | 95.6 | 85.0 | 10.6 | 109.5 |
| 13 | Invention | 17% AA 77.6% MAEG-TDI-MePEG5000 5.4% AE | 1.47 | 75.7 | 9.3 | 63.4 | 36.9 | 300 | 190 | 3800 | 820 | 590 | 280 | 96.1 | 85.0 | 11.1 | 112.6 |
| 14 | Invention | 10% AA 90% IDMBI MePEG5000 | 3.66 | 75.3 | 8.6 | 60.6 | 33.5 | 1630 | 460 | 12300 | 1500 | 2960 | 740 | 95.0 | 85.3 | 9.7 | 109.0 |

AA designates: acrylic acid
AMA designates: methacrylic acid
AE designates: ethyl acrylate
M MePEG350 designates: methoxypolyethylene glycol methacrylate with a molecular weight of 350
M MePEG5000 designates: methoxypolyethylene glycol methacrylate with a molecular weight of 750
MAEG-TDI-MePEG5000 designates: methacrylurethane, a product of the reaction of ethylene glycol methacrylate and diisocyanate toluene and of methoxypolyethylene glycol with a molecular weight of 5000
M MePEG5000 designates: the product of the reaction of methoxypolyethylene glycol of molecular weight 5000 with 3 isopropenyl α,α dimethylbenzyl isocyanate Table III shows that the copolymers according to the invention, used in a mineral filler grinding method, make a significant improvement to the activation of the optical brightness of the coated papers and to their whiteness, for different natures of the monomer b) containing the alkoxy polyalkylene glycol group, on the one hand, and, on the other hand, for a value of (m+n+p)q between 5 and 150, in the definition of the monomer b) as described via formula (I).

Moreover, these results also demonstrate that the copolymers according to the invention make it possible to obtain suspensions of mineral fillers that can be handled after storage without stirring.

EXAMPLE 4

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, the aim of this example is to illustrate the influence of the nature of the monomer selected from among components c) and d) of the copolymer according to the invention.

In this example, the first step is to grind suspensions of mineral matter as per the method described for example 2. Their granulometry and their Brookfield™ viscosity are determined as per the methods described for example 2. Said suspensions then enter into the composition of coating colours formulated as per the method described for example 2. Finally, said coating colours are used to coat paper sheets as per the method described for example 2, with a coating weight equal to 15 g/m². Said sheets are 21×29.7 cm precoated paper sheets with a specific weight of 96 g/m². Their whiteness is characterized by the parameters $R_{457+UV}$, $R_{457-UV}$, $\Delta UV$ and W(CEE) respectively equal to 88.4–85.8–2.6 and 89.5.

Test No. 15

This test illustrates the prior art and implements 0.70% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

This homopolymer of acrylic acid has a specific viscosity of 0.64 and is neutralized by means of calcium and sodium hydroxides.

Test No. 16

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 2.74, is neutralized by soda and consists of:
a) 11.8% acrylic acid and 16% methacrylic acid
b) 69.2% of a monomer of formula (I) in which:
  $R_1$ represents hydrogen
  $R_2$ represents hydrogen
  R represents the methacrylate group
  R' represents the methyl radical
  with (m+n+p)q=113
c) 3% of a monomer of formula (IIb) in which
  R represents the vinyl group
  B represents the methyl radical Test No. 17

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 2.88, is neutralized by soda and consists of:
a) 11.8% acrylic acid and 16% methacrylic acid
b) 69.2% of a monomer of formula (I) in which:
  $R_1$ represents hydrogen
  $R_2$ represents hydrogen
  R represents the methacrylate group
  R' represents the methyl radical
  with (m+n+p)q=113
c) 3% of a monomer of formula (IIb) in which
  R represents the methacrylate group
  A represents the propyl chain
  B represents the methyl radical Test No. 18

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 3.52, is neutralized by soda and consists of:
a) 11.8% acrylic acid and 16% methacrylic acid
b) 69.2% of a monomer of formula (I) in which:
  $R_1$ represents hydrogen
  $R_2$ represents hydrogen
  R represents the methacrylate group
  R' represents the methyl radical
  with (m+n+p)q=113
c) 3% of a monomer of formula (IIb) in which
  R represents the methacrylate group
  A represents the propyl chain
  B represents the methyl radical Test No. 19

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 1.99, is neutralized by soda and consists of:
a) 11.8% acrylic acid and 16% methacrylic acid
b) 69.2% of a monomer of formula (I) in which:
  $R_1$ represents hydrogen
  $R_2$ represents hydrogen
  R represents the methacrylate group R' represents the methyl radical
with (m+n+p)q=113
c) 3% of a monomer of formula (IIb) in which
R represents the methacrylate group
A represents the propyl chain
B represents the methyl radical Test No. 20

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 2.74, is neutralized by soda and consists of:
a) 11.8% acrylic acid and 16% methacrylic acid
b) 69.2% of a monomer of formula (I) in which:
$R_1$ represents hydrogen
$R_2$ represents hydrogen
R represents the methacrylate group
R' represents the methyl radical
with (m+n+p)q=113
c) 3% of 2 perfluoro alkyl ethyl acrylate consisting of a unit containing 21 fluorine atoms and 10 carbon atoms Test No. 21

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 2.78, is neutralized by soda and consists of:
a) 11.8% acrylic acid and 16% methacrylic acid
b) 68.9% of a monomer of formula (I) in which:
$R_1$ represents hydrogen
$R_2$ represents hydrogen
R represents the methacrylate group
R' represents the methyl radical
with (m+n+p)q=113
and 3% of a monomer of formula (I) in which
$R_1$ represents the methyl radical
$R_2$ represents hydrogen
R represents the methacrylate group
R' represents the buthyl radical
with (m+n+p)q=32
d) 0.3% of ethylene glycol dimethacrylate.

Test No. 22

This test illustrates the invention and implements 0.70% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 2.80, is neutralized by soda and consists of:
a) 11.8% acrylic acid and 16% methacrylic acid
b) 68.9% of a monomer of formula (I) in which:
$R_1$ represents hydrogen
$R_2$ represents hydrogen
R represents the methacrylate group
R' represents the methyl radical
with (m+n+p)q=113
and 3% of a monomer of formula (I) in which
$R_1$ represents the methyl radical
$R_2$ represents hydrogen
R represents the methacrylamido group
R' represents the methyl radical
with (m+n+p)q=22
d) 0.3% of a monomer of formula (III) in which:
$R_{13}$ represents the propyl methacrylate radical
$R_{16}$, $R_{17}$, $R_{18}$ and $R_{19}$ represent the methyl group
D and E are not present
m3=n3=p3=m4=n4=p4=0
r'=14

For all the tests 15 to 22, the dry matter content of the suspensions of mineral matter, their pH, their granulometry characterized by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring. Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 15 to 22 are summed up in table IV.

| Tests | | | | | | | | Brookfield™ viscosities (mPa·s) at t = 0 | | Brookfield™ viscosities (mPa·s) at t = 8 days before stirring | | Brookfield™ viscosities (mPa·s) at t = 8 days after stirring | | Whiteness | | | |
|---|---|---|---|---|---|---|---|---|---|---|---|---|---|---|---|---|---|
| No. | Prior art/ Invention | Composition of polymer | Dry Mat. Cont. | | | Grain size | | | | | | | | | | | |
| | | | $\eta_{spe}$ | (%) | pH | % < 2 μm | % < 1 μm | $\mu_{10}$ | $\mu_{100}$ | $\mu_{10}$ | $\mu_{100}$ | $\mu_{10}$ | $\mu_{100}$ | $R_{457+UV}$ | $R_{457+UV}$ | Δ UV | W (CIE) |
| 15 | Prior art | 100% AA | 0.64 | 76.0 | 9.0 | 90.1 | 59.6 | 390 | 150 | 1000 | 360 | 310 | 140 | 91.1 | 85.0 | 6 | 93 |
| 16 | Invention | 11.8% AA 16% AMA 69.2% M MePEG 5000 3% vinyltriethoxy silane | 2.74 | 76.5 | 9.3 | 79.1 | 46.1 | 1930 | 560 | 16000 | 2030 | 1670 | 570 | 94.8 | 85.4 | 9.4 | 107.1 |

-continued

| No. | Tests Prior art/ Invention | Composition of polymer | $\eta_{spe}$ | Dry Mat. Cont. (%) | pH | Grain size % < 2 μm | % < 1 μm | Brookfield™ viscosities (mPa·s) at t = 0 | | Brookfield™ viscosities (mPa·s) at t = 8 days before stirring | | Brookfield™ viscosities (mPa·s) at t = 8 days after stirring | | Whiteness | | | W |
|---|---|---|---|---|---|---|---|---|---|---|---|---|---|---|---|---|---|
| | | | | | | | | $\mu_{10}$ | $\mu_{100}$ | $\mu_{10}$ | $\mu_{100}$ | $\mu_{10}$ | $\mu_{100}$ | $R_{457+UV}$ | $R_{457+UV}$ | $\Delta UV$ | (CIE) |
| 17 | Invention | 11.8% AA 16% AMA 69.2% M MePEG 5000 3% 3-methacryloxy propyl trimethyl silane | 2.88 | 75.4 | 9.1 | 78.3 | 45.3 | 810 | 320 | 8480 | 1340 | 940 | 380 | 95.0 | 85.4 | 9.6 | 107.6 |
| 18 | Invention | 11.8% AA 16% AMA 69.2% M MePEG 5000 3% 3-methacryloxypropyl trimethylsilane | 3.52 | 76.1 | 9.2 | 75.8 | 44.1 | 1890 | 560 | 13980 | 1850 | 1120 | 420 | 94.8 | 85.2 | 9.4 | 107 |
| 19 | Invention | 11.8% AA 16% AMA 72.2% M MePEG 5000 3% 3-methacryloxypropyl trimethylsilane | 1.99 | 75.3 | 9.0 | 81.1 | 48.3 | 750 | 290 | 8080 | 1430 | 1340 | 430 | 95 | 85.6 | 9.6 | 107.3 |
| 20 | Invention | 11.8% AA 16% AMA 69.2% M MePEG 5000 3% of 2-ethyl perfluoro alkyl acrylate | 2.74 | 76.2 | 9.3 | 80.5 | 47.8 | 2390 | 680 | 14880 | 1900 | 1960 | 610 | 94.8 | 85.4 | 9.4 | 107.1 |

AA designates: acrylic acid
AMA designates: methacrylic acid
M MePEG5000 designates: methoxypolyethylene glycol methacrylate with a molecular weight of 5000

| No. | Tests Prior art/ Invention | Composition of polymer | $\eta_{spe}$ | Dry Mat. Cont. (%) | pH | Grain size % < 2 μm | % < 1 μm | Brookfield™ viscosities (mPa·s) at t = 0 | | Brookfield™ viscosities (mPa·s) at t = 8 days before stirring | | Brookfield™ viscosities (mPa·s) at t = 8 days after stirring | | Whiteness | | | W |
|---|---|---|---|---|---|---|---|---|---|---|---|---|---|---|---|---|---|
| | | | | | | | | $\mu_{10}$ | $\mu_{100}$ | $\mu_{10}$ | $\mu_{100}$ | $\mu_{10}$ | $\mu_{100}$ | $R_{457+UV}$ | $R_{457+UV}$ | $\Delta UV$ | (CIE) |
| 21 | Invention | 11.8% AA 16% AMA 68.9% M MePEG 5000 3% butoxy methacrylate 16 OE 16 OP 1700 0.3% ethylene glycol dimethacrylate | 2.78 | 76.3 | 9.2 | 82.6 | 49.9 | 3460 | 820 | 15560 | 2210 | 4160 | 1020 | 93.8 | 85.4 | 8.4 | 104.4 |
| 22 | Invention | 11.8% AA 16% AMA 68.9% M MePEG 5000 3% | 2.80 | 76.4 | 9.4 | 78.6 | 46.5 | 1980 | 570 | 11520 | 1840 | 1760 | 580 | 94.5 | 85.4 | 9.1 | 106.5 |

-continued

| Tests | | | | | | Grain size | | Brookfield™ viscosities (mPa·s) at t = 0 | | Brookfield™ viscosities (mPa·s) at t = 8 days before stirring | | Brookfield™ viscosities (mPa·s) at t = 8 days after stirring | | Whiteness | | | |
|---|---|---|---|---|---|---|---|---|---|---|---|---|---|---|---|---|---|
| No. | Prior art/ Invention | Composition of polymer | $\eta_{spe}$ | Dry Mat. Cont. (%) | pH | % < 2 μm | % < 1 μm | $\mu_{10}$ | $\mu_{100}$ | $\mu_{10}$ | $\mu_{100}$ | $\mu_{10}$ | $\mu_{100}$ | $R_{457+UV}$ | $R_{457+UV}$ | $\Delta$ UV | W (CIE) |
| | | methacrylamido methoxy OE 19 OP3 0.3% siloxane dimethacrylate with a molecular weight of 1100 | | | | | | | | | | | | | | | |

AA designates: acrylic acid
AMA designates: methacrylic acid
M MePEG5000 designates: methoxypolyethylene glycol methacrylate with a molecular weight of 5000
butoxy methacrylate 16 OE 16 OP 1700 designates: the b) monomer of the copolymer according to the invention as described in test 21
methacrylamido methoxy OE 19 OP3 designates: the b) monomer of the copolymer according to the invention as described in test 22
siloxane dimethacrylate with a molecular weight of 1100 designates: the d) monomer of the copolymer according to the invention as described in test 22

Table IV shows that the copolymers according to the invention, used in a mineral filler grinding method make a significant improvement to the optical brightness of the coated papers and to their whiteness, for different monomers c) or d) of the copolymer according to the invention.

Moreover, these results also demonstrate that the copolymers according to the invention make it possible to obtain suspensions of mineral fillers that can be handled after storage without stirring.

EXAMPLE 5

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, the aim of this example is to illustrate the influence of the specific viscosity of the copolymer according to the invention, at constant monomeric composition.

In this example, the first step is to grind suspensions of mineral matter as per the method described for example 2. Their granulometry and their Brookfield™ viscosity are determined as per the methods described for example 2. Said suspensions then enter into the composition of coating colours formulated as per the method described for example 2. Finally, said coating colours are used to coat paper sheets as per the method described for example 2, with a coating weight equal to 15 g/m². Said sheets are 21×29.7 cm precoated paper sheets with a specific weight of 96 g/m². Their whiteness is characterized by the parameters $R_{457+UV}$, $R_{457-UV}$, $\Delta$UV and W(CIE) respectively equal to 88.4–85.8–2.6 and 89.5.

For tests 23 to 28, the composition by weight of the copolymer according to the invention is constant and equal to:
a) 18.6% acrylic acid and 1.4% methacrylic acid
b) 80% of a monomer of formula (I) in which:
   $R_1$ represents hydrogen
   $R_2$ represents hydrogen
   R represents the methacrylate group
   R' represents the methyl radical
   with (m+n+p)q=113

Test No. 23

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 0.77 is neutralized by soda.

Test No. 24

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.00 is neutralized by soda.

Test No. 25

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.40 is neutralized by soda.

Test No. 26

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 2.72 is neutralized by soda.

Test No. 27

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 4.79 is neutralized by soda.

Test No. 28

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

Said copolymer, which has a specific viscosity of 7.85 is neutralized by soda.

The copolymers according to the invention as described in tests 23 to 28 are compared in this example to the polymer of the prior art described in test No. 10 of example 3. For all the tests 23 to 28, the dry matter content of the suspensions of mineral matter, their pH, their granulometry characterized by the percentage by weight of particles smaller than 1 and 2 µm, their Brookfield™ viscosities at 10 and 100 rpm ($\mu_{10}$ and $\mu_{100}$) determined at t=0, and then at t=8 days, are determined before and after stirring. Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 23 to 28 are summed up in table V.

Table V shows that the copolymers according to the invention, used in a mineral filler grinding method, make a significant improvement to the activation of the optical brightness of the coated papers and to their whiteness, for a broad range of specific viscosities ranging from 0.5 to 8.

Moreover, these results also demonstrate that the copolymers according to the invention make it possible to obtain suspensions of mineral fillers that can be handled after storage without stirring.

EXAMPLE 6

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, this example is designed to illustrate the influence of the monomeric composition of a copolymer according to the invention, for a constant rate of methoxy polyethylene glycol methacrylate of molecular weight 5000.

In this example, the first step is to grind suspensions of mineral matter as per the method described for example 2. Their granulometry and their Brookfield™ viscosity are determined as per the methods described for example 2. Said suspensions then enter into the composition of coating colours formulated as per the method described for example 2. Finally, said coating colours are used to coat paper sheets as per the method described for example 2, with a coating weight equal to 15 g/m². Said sheets are 21×29.7 cm precoated paper sheets with a specific weight of 96 g/m². Their whiteness is characterized by the parameters $R_{457+UV}$, $R_{457-UV}$, $\Delta UV$ and W(CIE) respectively equal to 88.4–85.8–2.6 and 89.5.

Test No. 29

This test illustrates the prior art and implements 0.65% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 µm determined using a Sedigraph™ 5100 grain size analyzer, and has a dry matter content of 76%.

| Tests | | Composition | | Dry Mat. | | Grain size | | Brookfield ™ viscosities (mPa·s) | | Brookfield ™ viscosities (mPa·s) at t = 8 days before stirring | | Brookfield ™ viscosities (mPa·s) at t = 8 days after stirring | | Whiteness | | | |
|---|---|---|---|---|---|---|---|---|---|---|---|---|---|---|---|---|---|
| No. | Prior art/ Invention | of polymer | $\eta_{spe}$ | (%) | pH | % < 2 µm | % < 1 µm | at t = 0 | | | | | | | | | W |
| | | | | | | | | $\mu_{10}$ | $\mu_{100}$ | $\mu_{10}$ | $\mu_{100}$ | $\mu_{10}$ | $\mu_{100}$ | $R_{457+UV}$ | $R_{457+UV}$ | $\Delta$ UV | (CIE) |
| 10 | Prior art | 100% AA | 0.64 | 76.0 | 9.4 | 60.2 | 37 | 400 | 140 | 670 | 320 | 330 | 130 | 91.4 | 84.9 | 6.5 | 95.7 |
| 23 | Invention | 18.6% AA | 0.77 | 75.5 | 8.8 | 47.5 | 25.5 | 6380 | 1220 | 10800 | 2090 | 6680 | 1320 | 96.7 | 84.9 | 11.8 | 113.8 |
| 24 | Invention | | 1.00 | 75.0 | 9.1 | 59.4 | 34.4 | 160 | 140 | 1880 | 600 | 250 | 190 | 96.2 | 84.8 | 11.4 | 112.7 |
| 25 | Invention | 1.4% AMA | 1.40 | 75.2 | 9.2 | 65.3 | 37.9 | 270 | 160 | 1880 | 580 | 320 | 180 | 96.9 | 84.9 | 12 | 114.9 |
| 26 | Invention | | 2.72 | 75.4 | 9.4 | 57.2 | 30.4 | 810 | 310 | 5200 | 1150 | 990 | 350 | 96.9 | 84.8 | 12.1 | 115.1 |
| 27 | Invention | 80% M | 4.79 | 54.7 | 9.2 | 54.7 | 28.9 | 1270 | 360 | 8600 | 1220 | 990 | 330 | 97.3 | 85.9 | 11.4 | 114.7 |
| 28 | Invention | MePEG5000 | 7.85 | 75.5 | 9.7 | 52.6 | 27.4 | 380 | 190 | 4660 | 970 | 530 | 240 | 97.8 | 85.8 | 12 | 114.9 |

AA designates: acrylic acid
AMA designates: methacrylic acid
M MePEG5000 designates: methoxypolyethylene glycol methacrylate with a molecular weight of 5000

This homopolymer of acrylic acid has a specific viscosity of 0.64 and is neutralized by means of calcium and sodium hydroxides.

Test No. 30

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.34, is neutralized by soda and consists of:
  a) 8.6% acrylic acid and 1.4% methacrylic acid
  b) 80% of a monomer of formula (I) in which:
    $R_1$ represents hydrogen
    $R_2$ represents hydrogen
    R represents the methacrylate group
    R' represents the methyl radical
    with (m+n+p)q=113
  c) 10% of acrylamide Test No. 31

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.24 is neutralized by soda and consists of:
  a) 8.6% acrylic acid, 1.4% methacrylic acid and 10% itaconic acid
  b) 80% of a monomer of formula (I) in which:
    $R_1$ represents hydrogen
    $R_2$ represents hydrogen
    R represents the methacrylate group
    R' represents the methyl radical
    with (m+n+p)q=113

Test No. 32

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.38, is neutralized by soda and consists of:
  a) 8.6% acrylic acid, 1.4% methacrylic acid and 10% of ethylene glycol methacrylate phosphate
  b) 80% of a monomer of formula (I) in which:
    $R_1$ represents hydrogen
    $R_2$ represents hydrogen
    R represents the methacrylate group
    R' represents the methyl radical
    with (m+n+p)q=113

Test No. 33

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.24, is neutralized by soda and consists of:
  a) 8.6% acrylic acid, 1.4% methacrylic acid and 10% of acrylamidomethylpropane sulfonic acid
  b) 80% of a monomer of formula (I) in which:
    R1 represents hydrogen
    R2 represents hydrogen
    R represents the methacrylate group
    R' represents the methyl radical
    with (m+n+p)q=113

Test No. 34

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.92, is neutralized by soda and consists of:
  a) 20% methacrylic acid
  b) 80% of a monomer of formula (I) in which:
    $R_1$ represents hydrogen
    $R_2$ represents hydrogen
    R represents the methacrylate group
    R' represents the methyl radical
    with (m+n+p)q=113

The copolymers according to the invention as described in tests 30 to 33 are compared in this example to the polymer of the prior art described in test No. 10 of example 3. The copolymer according to the invention as described in test No. 34 is compared in this example to the polymer of the prior art described in test No. 29 of this example. In fact, as can be seen in the corresponding table of values, the polymers that made it possible to obtain suspensions of mineral matter of similar granulometry are compared.

For all the tests 30 to 34, the dry matter content of the suspensions of mineral matter, their pH, their granulometry characterized by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring.

Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 30 to 34 are summed up in table VI.

| Tests No. | Prior art/ Invention | Composition of polymer | $\eta_{spe}$ | Dry Mat. Cont. (%) | pH | Grain size %< 2 μm | %< 1 μm | Brookfield™ viscosities (mPa·s) at t = 0 $\mu_{10}$ | $\mu_{100}$ | Brookfield™ viscosities (mPa·s) at t = 8 days before stirring $\mu_{10}$ | $\mu_{100}$ | Brookfield™ viscosities (mPa·s) at t = 8 days after stirring $\mu_{10}$ | $\mu_{100}$ | Whiteness $R_{457+UV}$ | $R_{457+UV}$ | Δ UV | W (CIE) |
|---|---|---|---|---|---|---|---|---|---|---|---|---|---|---|---|---|---|
| 10 | Prior art | 100% AA | 0.64 | 76.0 | 9.4 | 60.2 | 37 | 400 | 140 | 670 | 320 | 330 | 130 | 91.4 | 84.9 | 6.5 | 95.7 |
| 30 | Invention | 8.6% AA 1.4% AMA 10% Acrylamide 80% M MePEG350 | 1.34 | 75.4 | 8.6 | 62.2 | 35.9 | 240 | 170 | 2000 | 720 | 390 | 230 | 97.1 | 85.1 | 12 | 114.9 |
| 31 | Invention | 8.6% AA 1.4% AMA 10% Itaconic acid 80% M MePEG5000 | 1.24 | 75.9 | 9.0 | 61.6 | 34 | 260 | 150 | 1320 | 570 | 370 | 180 | 97.2 | 84.7 | 12.5 | 115.6 |
| 32 | Invention | 8.6% AA 1.4% AMA 10% MAEG Phosphate 80% M MePEG5000 | 1.38 | 75.6 | 9.0 | 58.7 | 31.8 | 300 | 170 | 1480 | 420 | 280 | 170 | 97.0 | 84.8 | 12.2 | 115.0 |
| 33 | Invention | 8.6% AA 1.4% AMA 10% AMPS 80% M MePEG5000 | 1.24 | 75.4 | 8.7 | 58.7 | 31.6 | 210 | 180 | 1380 | 610 | 350 | 220 | 97.1 | 85.1 | 12 | 111.5 |
| 29 | Prior art | 100% AA | 0.64 | 75.7 | 9.5 | 82.8 | 50.0 | 450 | 180 | 2700 | 600 | 410 | 150 | 91.0 | 85.0 | 6.0 | 95.2 |
| 34 | Invention | 20% AMA 80% M MePEG5000 | 1.92 | 75.8 | 8.9 | 81.2 | 48.7 | 1220 | 450 | 12900 | 2040 | 2920 | 780 | 96.8 | 85.5 | 11.3 | 113.8 |

AA designates: acrylic acid
AMA designates: methacrylic acid
MAEG phosphate designates: ethyleneglycol methacrylate phosphate
AE designates: acrylamido methyl sulfonic propane acid
M MePEG5000 designates: methoxypolyethylene glycol methacrylate with a molecular weight of 5000

Table VI shows that the copolymers according to the invention, used in a mineral filler grinding method, make a significant improvement to the activation of the optical brightness of the coated papers and to their whiteness, for a constant rate of methoxypolyethylene glycol methacrylate of molecular weight 5000, for a wide variety of monomeric compositions.

Moreover, these results also demonstrate that the copolymers according to the invention make it possible to obtain suspensions of mineral fillers that can be handled after storage without stirring.

EXAMPLE 7

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, the aim of this example is to illustrate the influence of the rate and of the nature of the neutralization of the copolymer according to the invention, at constant monomeric composition.

In this example, the first step is to grind suspensions of mineral matter as per the method described for example 2. Their granulometry and their Brookfield™ viscosity are determined as per the methods described for example 2. Said suspensions then enter into the composition of coating colours formulated as per the method described for example 2. Finally, said coating colours are used to coat paper sheets as per the method described for example 2, with a coating weight equal to 15 g/m². Said sheets are 21×29.7 cm pigmented paper sheets with a specific weight of 76 g/m². Their whiteness is characterized by the parameters $R_{457+UV}$, $R_{457-UV}$, ΔUV and W(CIE) respectively equal to 90.9–83.8–7.1 and 103.6.

For tests 36 to 39 and 41 to 44, the composition of the copolymer according to the invention is fixed, in weight terms, at:

a) 11.8% acrylic acid and 16% methacrylic acid
b) 72.2% of a monomer of formula (I) in which:
   $R_1$ represents hydrogen
   $R_2$ represents hydrogen
   R represents the methacrylate group
   R' represents the methyl radical
   with (m+n+p)q=8

Test No. 35

This test illustrates the prior art and implements 0.65% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said homopolymer, which has a specific viscosity of 0.64 when it is neutralized by soda, is neutralized by a system consisting of moles of 70% sodium ions and 30% calcium ions for this test.

Test No. 36

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This copolymer, which has a specific viscosity of 1.08 when it is neutralized by soda, is totally neutralized by the potassium ion for this test.

Test No. 37

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.08 when it is neutralized by soda, is neutralized by a system consisting of moles of 70% sodium ions and 30% calcium ions for this test.

Test No. 38

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said copolymer, which has a specific viscosity of 1.08 when it is neutralized by soda, is neutralized by a system consisting of moles of 50% sodium ions and 50% magnesium ions for this test.

Test No. 39

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This copolymer, which has a specific viscosity of 1.08 when it is neutralized by soda, is totally neutralized by aminomethylpropanol for this test.

Test No. 40

This test illustrates the prior art and implements 0.65% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

Said homopolymer, which has a specific viscosity of 0.64 when it is neutralized by soda, is neutralized by a system consisting of moles of 70% sodium ions and 30% calcium ions for this test.

Test No. 41

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This copolymer, which has a specific viscosity of 1.08 when it is neutralized by soda, is not neutralized for this test (all its carboxylic functions remain acid).

Test No. 42

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76%.

This copolymer, which has a specific viscosity of 1.08 when it is neutralized by soda, is totally neutralized by triethanolamine for this test.

Test No. 43

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76% by weight.

This copolymer, which has a specific viscosity of 1.08 when it is neutralized by soda, is totally neutralized by the ammonium ion for this test.

Test No. 44

This test illustrates the invention and implements 0.65% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 76% by weight.

This copolymer, which has a specific viscosity of 1.08 when it is neutralized by soda, is totally 50% neutralized by the potassium ion, 50% of its functions remaining acid.

For all the tests 35 to 44, the dry matter content of the suspensions of mineral matter, their pH, their granulometry characterized by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring. Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 35 to 44 are summed up in table VII.

| Tests No. | Prior art/ Invention | Composition of polymer | Neutralization | $\eta_{spe}$ | Dry Mat. Cont. (%) | pH | Grain size % < 2 μm | Grain size % < 1 μm | Brookfield™ viscosities (mPa·s) at t = 0 $\mu_{10}$ | Brookfield™ viscosities (mPa·s) at t = 0 $\mu_{100}$ | Brookfield™ viscosities (mPa·s) at t = 8 days before stirring $\mu_{10}$ | Brookfield™ viscosities (mPa·s) at t = 8 days before stirring $\mu_{100}$ | Brookfield™ viscosities (mPa·s) at t = 8 days after stirring $\mu_{10}$ | Brookfield™ viscosities (mPa·s) at t = 8 days after stirring $\mu_{100}$ | Whiteness $R_{457+UV}$ | Whiteness $R_{457+UV}$ | Δ UV | W (CIE) |
|---|---|---|---|---|---|---|---|---|---|---|---|---|---|---|---|---|---|---|
| 35 | Prior art | 100% AA | 70% Na 30% Ca | 0.64 | 75.5 | 9.5 | 90.6 | 60.4 | 310 | 120 | 2690 | 600 | 290 | 130 | 94.0 | 85.4 | 8.536 | 107.7 |
| 36 | Invention | 11.8% AA | 100% K | 1.08 | 75.9 | 9.1 | 78.0 | 49.4 | 2330 | 890 | 18000 | 4300 | 7500 | 1070 | 95.6 | 85.1 | 10.5 | 110.7 |
| 37 | Invention | 16% AMA | 70% Na 30% Ca | 1.08 | 76.0 | 8.7 | 81.9 | 50 | 2090 | 560 | 10200 | 1470 | 1690 | 580 | 96.0 | 85.4 | 10.6 | 111.2 |
| 38 | Invention | 72.2% M MePEG350 | 50% Na 50% Mg | 1.08 | 76.7 | 8.9 | 79.4 | 47.9 | 660 | 280 | 8440 | 1340 | 1220 | 460 | 96.0 | 85.2 | 10.8 | 111.9 |
| 39 | Invention | | 100% AMP | 1.08 | 75.8 | 9.2 | 76.2 | 45.6 | 5500 | 1350 | 15000 | 3240 | 7800 | 1850 | 96.3 | 85.3 | 11.0 | 114.5 |
| 40 | Prior art | 100% AA | 70% Na 30% Ca | 0.64 | 75.1 | 9.5 | 61.6 | 36.0 | 330 | 120 | 420 | 220 | 230 | 110 | 95.0 | 85.9 | 10.1 | 111.2 |
| 41 | Invention | 11.8% AA | Not neutralized | 1.08 | 75.1 | 7.7 | 61.7 | 34.8 | 1830 | 410 | 3480 | 780 | 970 | 280 | 96.2 | 84.8 | 11.4 | 113.8 |
| 42 | Invention | 16% AMA | 100% TEA | 1.08 | 75.2 | 8.3 | 55.2 | 31.5 | 550 | 220 | 2900 | 680 | 970 | 290 | 97.0 | 84.7 | 11.3 | 112.0 |
| 43 | Invention | 72.2% M | 100% NH4 | 1.08 | 75.5 | 8.6 | 66 | 38.5 | 1340 | 500 | 5800 | 1490 | 3140 | 780 | 96.2 | 85.1 | 11.1 | 112.2 |
| 44 | Invention | MePEG350 | 50% K | 1.08 | 76.3 | 8.5 | 66.7 | 37.6 | 670 | 270 | 3880 | 830 | 660 | 270 | 96.3 | 84.9 | 11.4 | 112.7 |

AA designates: acrylic acid
AMA designates: methacrylic acid
M MePEG350 designates: methoxypolyethylene glycol methacrylate with a molecular weight of 350
AMP designates: aminomethylpropanol
TEA designates: triethanolamine Table VII shows that the copolymers according to the invention, used in a mineral filler grinding method, make a significant improvement to the activation of the optical brightness of the coated papers and to their whiteness, for a constant monomeric composition and for different rates and natures of the neutralization system envisaged. Moreover, these results also demonstrate that the copolymers according to the invention make it possible to obtain suspensions of mineral fillers that that can be handled after storage without stirring.

EXAMPLE 8

This example relates to the use of copolymers according to the invention in a mineral filler grinding method. It also relates to the use of the suspensions thus obtained in the manufacture of coating colours, said coating colours being used to coat papers. This example also relates to the measurement of the optical brightness and of the whiteness of the papers thus obtained. Finally, the aim of this example is to illustrate the different monomeric compositions of a copolymer according to the invention.

In this example, the first step is to grind suspensions of mineral matter as per the method described for example 2. Their granulometry and their Brookfield™ viscosity are determined as per the methods described for example 2. Said suspensions then enter into the composition of coating colours made by incorporating, for 100 parts by weight of dry pigment of said ground suspension of calcium carbonate, 10 parts by dry weight of a styrene-butadiene latex marketed by DOW CHEMICAL under the name DL950™, 0.2 parts of a co-binder marketed by COATEX under the name Rheocoat™ 35, and 1 part by weight as is of optical brightener marketed by BAYER under the name Blancophor P™.

Finally, said coating colours are used to coat paper sheets as per the method described for example 2, with a coating weight equal to 15 g/m2. Said sheets are 21×29.7 cm pre-coated paper sheets with a specific weight of 96 g/m2.

Test No. 45

This test illustrates the prior art and implements 0.65% by dry weight measured with respect to the dry weight of mineral filler, of a homopolymer of acrylic acid according to the prior art to grind a suspension of calcium carbonate. The suspension of calcium carbonate contains, before grinding 20% by weight of particles with a diameter of less than 2 μm determined using a Sedigraph™ 5100 grain size analyzer, and has a dry matter content of 78.2%.

This homopolymer of acrylic acid has a specific viscosity of 0.64 and is neutralized by means of calcium and sodium hydroxides.

Test No. 46

This test illustrates the invention and implements 1.50% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 78.3%.

Said copolymer is neutralized by soda and consists of:
a) 13.3% acrylic acid and 3.3% methacrylic acid
b) 78.4% of a monomer of formula (I) in which:
    $R_1$ represents hydrogen
    $R_2$ represents hydrogen
    R represents the methacrylate group
    R' represents the methyl radical
    With m=p=0; n=45; q=1 and (m+n+p)q=45
c) 5% of vinylpyrrolidone.

Test No. 47

This test illustrates the invention and implements 1.20% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 78.6%.

Said copolymer is neutralized by soda and consists of:
a) 94% acrylic acid and 1% maleic anhydride
b) 5% of a monomer of formula (I) in which:
    $R_1$ represents hydrogen
    $R_2$ represents hydrogen
    R represents the vinyl group
    R' represents hydrogen
    With m=p=0; n=113; q=1 and (m+n+p)q=113

Test No. 48

This test illustrates the invention and implements 1.50% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 75%.

Said copolymer is neutralized by soda and consists of:
a) 94% acrylic acid and 1% maleic anhydride
b) 2% of a monomer of formula (I) in which:
    $R_1$ represents hydrogen
    $R_2$ represents hydrogen
    R represents the vinyl group
    R' represents hydrogen
    With m=p=0; n=113; q=1 and (m+n+p)q=113
c) 3% of a monomer of formula (IIb) in which:
    R represents the methacrylate group
    A represents the propyl chain
    B represents the methyl radical For all the tests 45 to 48, the dry matter content of the suspensions of mineral matter, their pH, their granulometry characterized by the percentage by weight of particles smaller than 1 and 2 μm, their Brookfield™ viscosities at 10 et 100 rpm ($\mu_{10}$ et $\mu_{100}$) determined at t=0, and then at t=8 days, are determined before and after stirring.

Finally the parameters $R_{457+UV}$ et $R_{457-UV}$ are measured for coated papers according to standards NF Q 03-038 et NF Q 03-039 then the difference $\Delta UV = R_{457+UV} - R_{457-UV}$, is calculated, and the W(CIE) parameter is also measured according to standard ISO/FDIS 11475.

All the results corresponding to tests No. 45 to 48 are summed up in table VIII.

| N° | Tests Prior art/ Invention | Composition of polymer | Dry Mat. Cont. (%) | Grain size % < 2 μm | Grain size % < 1 μm | Brookfield™ viscosities (mPa·s) at t = 0 $\mu_{10}$ | Brookfield™ viscosities (mPa·s) at t = 0 $\mu_{100}$ | Brookfield™ viscosities (mPa·s) at t = 8 days before stirring $\mu_{10}$ | Brookfield™ viscosities (mPa·s) at t = 8 days before stirring $\mu_{100}$ | Brookfield™ viscosities (mPa·s) at t = 8 days after stirring $\mu_{10}$ | Brookfield™ viscosities (mPa·s) at t = 8 days after stirring $\mu_{100}$ | Whiteness $R_{457+UV}$ | Whiteness $R_{457-UV}$ | Whiteness Δ UV | Whiteness W(CIE) |
|---|---|---|---|---|---|---|---|---|---|---|---|---|---|---|---|
| 45 | Prior Art | 100% AA | 78.2 | 89.3 | 61.2 | 730 | 244 | 7100 | 1580 | 1800 | 610 | 89.5 | 85.2 | 4.3 | 90.4 |
| 46 | Invention | 13.3% AA 3.3% AMA 5% VP 78.4% M MePEG2000 | 78.3 | 95.1 | 66.9 | 1820 | 570 | 18000 | 3730 | 2300 | 720 | 92.4 | 85.3 | 7.1 | 108.2 |
| 47 | Invention | 94% AA 1% Maleic anhydrid 5% Vinyl PEG5000 | 78.6 | 90.8 | 62 | 2150 | 750 | 28000 | 4120 | 6600 | 1790 | 90.6 | 85.0 | 5.6 | 93.4 |
| 48 | Invention | 94% AA 1% Maleic anhydrid 2% Vinyl PEG5000 | 75.0 | 93.8 | 62 | 1950 | 600 | 19000 | 3880 | 2560 | 850 | 90.8 | 84.9 | 5.9 | 92.5 |

-continued

| Tests Prior art/ N° | Composition of Invention polymer | Dry Mat. Cont. (%) | Grain size | | Brookfield™ viscosities (mPa·s) at t = 0 | | Brookfield™ viscosities (mPa·s) at t = 8 days before stirring | | Brookfield™ viscosities (mPa·s) at t = 8 days after stirring | | Whiteness | | | |
|---|---|---|---|---|---|---|---|---|---|---|---|---|---|---|
| | | | % < 2 μm | % < 1 μm | $\mu_{10}$ | $\mu_{100}$ | $\mu_{10}$ | $\mu_{100}$ | $\mu_{10}$ | $\mu_{100}$ | $R_{457+UV}$ | $R_{457-UV}$ | Δ UV | W(CIE) |
| | 3% formula (IIb) | | | | | | | | | | | | | |

AA designates: acrylic acid
AMA designates: methacrylic acid
VP designates: vinyl pyrrolidone
M MePEG2000 designates: methoxypolyethylene glycol methacrylate with a molecular weight of 2000

Table VIII shows that the copolymers according to the invention of different monomeric compositions, used in a mineral filler grinding method make a significant improvement to the activation of the optical brightness of the coated papers and to their whiteness.

EXAMPLE 9

This example relates to the use of copolymers according to the invention in a mineral filler manufacturing method. It also relates to the use of the fillers thus obtained in the manufacture of paper. This example also relates to the measurement of the optical brightness and of the whiteness of the papers thus obtained. Finally, this example is designed to illustrate the effectiveness of the copolymers according to the invention in improving the activation of the optical brightness and the whiteness of the papers manufactured.

In the tests corresponding to this example, the first step is to grind a suspension of mineral matter, according to the method described for example 2. The mineral filler is calcium carbonate. For each test, use is made of a constant quantity of grinding agent which is either a copolymer according to the invention, or a grinding agent of the prior art; this quantity is equal to 0.35% by dry weight of copolymer measured with respect to the dry weight of mineral filler. The granulometry of said suspension is determined using a Sedigraph™ 5100 grain size analyzer. Its Brookfield™ viscosity at 10 and 100 rpm ($\mu_{10}$ and $\mu_{100}$) is also measured at t=0, and after 8 days before and after stirring, according to the operating procedure described in example 2.

Following the measurement of Brookfield™ viscosity at t=0, the filler is used to manufacture a sheet of paper in accordance with the following method.

This gives a pulp which is a mixture of 30% by weight of resinous fibres and 70% by weight of eucalyptus fibres. This pulp is refined in a Valley stack at 30° SR, the refining concentration being 16 g/l. Said pulp is contained in a Franck type former bowl. 1% by weight (with respect to the total dry weight of fibres) of the Blancophor P 01™ optical brightener market by BAYER is incorporated in this pulp. Then 0.6% by weight, with respect to the total dry weight of fibres, of the Keydime™ C222 glue marketed by EKA CHEMICAL is introduced. Then the filler in the form of an aqueous suspension is added at a rate of 30% by weight with respect to the total weight of fibres. The result is diluted to obtain a sheet with a final grammage of 80 g/m². A retention system of the cationic/polyacrylamide starch type is also introduced. The cationic starch is Hi-Cat™ 5283 marketed by ROQUETTE and the polyacrylamide is Percol™ 178 marketed by CIBA.

The quantity of retention agent is adjusted so as to obtain a percentage of residual fillers of 20% by weight in the sheet obtained.

Finally the parameters $R_{457+UV}$ and $R_{457-UV}$ are measured for the manufactured papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

Test No. 49

This test illustrates the prior art and implements 0.35% by dry weight, measured with respect to the dry weight of mineral filler, of a homopolymer of acrylic acid according to the prior art to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 65% by weight.

This homopolymer of acrylic acid has a specific viscosity of 0.64 and is neutralized by means of calcium and sodium hydroxides.

Test No. 50

This test illustrates the invention and implements 0.35% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 65% by weight.

Said copolymer, which has a specific viscosity of 1.10, is neutralized by soda and consists of:
 a) 14.1% acrylic acid and 3.4% methacrylic acid
 b) 82.5% of a monomer of formula (I) in which:
  $R_1$ represents hydrogen
  $R_2$ represents hydrogen
  R represents the methacrylate group
  R' represents the methyl radical
  with (m+n+p)q=45

Test No. 51

This test illustrates the invention and implements 0.35% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 65% by weight.

Said copolymer, which has a specific viscosity of 1.49, is neutralized by soda and consists of:
a) 13.7% acrylic acid and 3.3% methacrylic acid
b) 83% of a monomer of formula (I) in which:
  $R_1$ represents hydrogen
  $R_2$ represents hydrogen
  R represents the methacrylate group
  R' represents the methyl radical
  with $(m+n+p)q=113$ Test No. 52

This test illustrates the invention and implements 0.35% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 65% by weight.

Said copolymer, which has a specific viscosity of 1.27, is neutralized by soda and consists of:
a) 8.5% acrylic acid and 1.5% methacrylic acid
b) 90% of a monomer of formula (I) in which:
  $R_1$ represents hydrogen
  $R_2$ represents hydrogen
  R represents the methacrylate group
  R' represents the methyl radical
  with $(m+n+p)q=113$ Test No. 53

This test illustrates the invention and implements 0.35% by dry weight, measured with respect to the dry weight of mineral filler, of a copolymer according to the invention to grind a suspension of calcium carbonate. The suspension of calcium carbonate contains, before grinding, 20% by weight of particles with a diameter of less than 2 μm determined using a Sedigraph™ 5100 grain size analyzer, and has a dry matter content of 65% by weight.

Said copolymer, which has a specific viscosity of 1.56, is neutralized by soda and consists of:
a) 8.5% acrylic acid and 1.5% methacrylic acid
b) 90% of a monomer of formula (D) in which:
  $R_1$ represents hydrogen
  $R_2$ represents hydrogen
  R represents the methacrylate group
  R' represents the methyl radical
  with $(m+n+p)q=113$ For all the tests 9 to 53, the granulometry of the ground suspensions of mineral filler, identified by the percentage by weight of particles smaller than 1 and 2 μm, their Brookfield™ viscosities at 10 and 100 rpm ($\mu_{10}$ and $\mu_{100}$) determined at t=0, and then at t=8 days, are determined before and after stirring.

Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CEE) parameter is also measured according to standard ISO/FDIS 11475.

All the results corresponding to tests No. 49 to 53 are summed up in table IX.

| No. | Tests Prior art/ Invention | Composition of polymer | $\eta_{spe}$ | Grain size % < 2 μm | % < 1 μm | Brookfield™ viscosities (mPa·s) at t = 0 $\mu_{10}$ | $\mu_{100}$ | Brookfield™ viscosities (mPa·s) at t = 8 days before stirring $\mu_{10}$ | $\mu_{100}$ | Brookfield™ viscosities (mPa·s) at t = 8 days after stirring $\mu_{10}$ | $\mu_{100}$ | Optical brightener Δ UV | Whiteness W (CIE) |
|---|---|---|---|---|---|---|---|---|---|---|---|---|---|
| 49 | Prior art | 100% AA | 0.64 | 59.0 | 29.1 | 120 | 110 | sedimentation | | 130 | 110 | 8.0 | 98.5 |
| 50 | Invention | 14.1% AA 3.4% AMA 82.5% M MePEG2000 | 1.10 | 58.4 | 28.3 | 450 | 110 | 1380 | 220 | 540 | 120 | 8.6 | 102.0 |
| 51 | Invention | 13.7% AA 3.3% AMA 83% M MePEG5000 | 1.49 | 59.0 | 28.5 | 4440 | 580 | 4640 | 620 | 3250 | 490 | 8.8 | 101.8 |
| 52 | Invention | 8.5% AA 1.5% AMA 90% M MePEG5000 | 1.27 | 59.1 | 29.5 | 1160 | 230 | 1560 | 280 | 480 | 160 | 8.5 | 99.8 |
| 53 | Invention | 8.5% AA 1.5% AMA 90% M MePEG5000 | 1.56 | 59.4 | 29.3 | 2500 | 490 | 2880 | 430 | 1620 | 340 | 8.4 | 99.5 |

AA designates: acrylic acid
AMA designates: methacrylic acid
M MePEG2000 designates: methoxypolyethylene glycol methacrylate with a molecular weight of 2000
M MePEG5000 designates: methoxypolyethylene glycol methacrylate with a molecular weight of 5000

Table IX shows that the copolymers according to the invention, used in a filler manufacturing method, make a significant improvement to the activation of optical brightness of manufactured papers and their whiteness.

Moreover, these results also demonstrate that the copolymers according to the invention make it possible to obtain suspensions of mineral fillers that can be handled after storage without stirring.

EXAMPLE 10

This example relates to the use of copolymers according to the invention as additives in a coating colour manufacturing method. It also relates to the use of the coating colours thus obtained in the manufacture of coated paper. This example also relates to the measurement of the optical brightness and of the whiteness of the coated papers thus obtained. Finally, this example is designed to illustrate the effectiveness of the copolymers according to the invention in improving the activation of the optical brightness and the whiteness of the coated papers.

In the tests corresponding to this example, the first step is to mix, in accordance with methods with which the skilled man in the art is familiar, a suspension of calcium carbonate marketed by OMYA under the name Setacarb™, and a suspension of kaolin marketed by HUBER under the name Hydragloss™ 90. The mix is then made by incorporating, for 100 parts by weight of dry pigment, 10 parts by dry weight of a styrene-butadiene latex marketed by DOW CHEMICAL under the name DL950™ and 1 part by weight as is of the optical brightener Blancophor P™ marketed by BAYER. Then, possibly, 1 half part by dry weight of an optical brightness support known to the skilled man in the art, i.e. polyvinyl alcohol marketed under the name Mowiol™ 4-98 by CLARIANT, is added. A copolymer according to the invention in proportions which will be specified for each of the tests may or may not be added.

These mixes are then used to coat paper sheets according to the method described in example 2, with a coating weight equal to 15 g/m². Said sheets are 21×29.7 cm pigmented paper sheets with a specific weight of 76 g/m². Their whiteness is characterized by the parameters $R_{457+UV}$, $R_{457-UV}$, $\Delta UV$ and W(CIE) respectively equal to 90.9-83.8-7.1 and 103.6.

Test No. 54

This test illustrates the prior art and implements, for the production of the mix, the above-mentioned mixture of mineral fillers, the above-mentioned latex and the above-mentioned optical brightener, in the proportions defined at the beginning of example 9.

Test No. 55

This test illustrates the invention and implements, for the production of the mix, the above-mentioned mixture of mineral fillers, the above-mentioned latex and the above-mentioned optical brightener, in the proportions defined at the beginning of example 9. It also implements, in the formulation of the mix, 1.5 parts by dry weight of a copolymer according to the invention.

Said copolymer, which has a specific viscosity of 14.2, is neutralized by soda and consists of:
   a) 13.6% acrylic acid and 3.4% methacrylic acid
   b) 83% of a monomer of formula (I) in which:
       $R_1$ represents hydrogen
       $R_2$ represents hydrogen
       R represents the methacrylate group
       R' represents the methyl radical
       with (m+n+p)q=45

Test No. 56

This test illustrates the invention and implements, for the production of the coating colour, the above-mentioned mixture of mineral fillers, the above-mentioned latex and the above-mentioned optical brightener, in the proportions defined at the beginning of example 9.

It also implements, in the formulation of the coating colour, 1 part by dry weight of a copolymer according to the invention.

Said copolymer, which has a specific viscosity of 4.83, is neutralized by soda and consists of:
   a) 13.6% acrylic acid and 3.4% methacrylic acid
   b) 83% of a monomer of formula (I) in which:
       $R_1$ represents hydrogen
       $R_2$ represents hydrogen
       R represents the methacrylate group
       R' represents the methyl radical
       with (m+n+p)q=45

Test No. 57

This test illustrates the prior art and implements, for the production of the coating colour, the above-mentioned mixture of mineral fillers, the above-mentioned latex and the above-mentioned optical brightener, in the proportions defined at the beginning of example 9.

It also implements 0.5 parts by dry weight of polyvinyl alcohol as optical brightness support.

Test No. 58

This test illustrates the invention and implements, for the production of the coating colour, the above-mentioned mixture of mineral fillers, the above-mentioned latex and the above-mentioned optical brightener, in the proportions defined at the beginning of example 9.

It also implements, in the formulation of the mix, 0.5 parts by dry weight of polyvinyl alcohol as optical brightness medium, and 0.9 parts by dry weight of a copolymer according to the invention.

Said copolymer, which has a specific viscosity of 14.2, is neutralized by soda and consists of:
   a) 13.6% acrylic acid and 3.4% methacrylic acid
   b) 83% of a monomer of formula (I) in which:
       $R_1$ represents hydrogen
       $R_2$ represents hydrogen
       R represents the methacrylate group
       R' represents the methyl radical
       with (m+n+p)q=45

Test No. 59

This test illustrates the invention and implements, for the production of the coating colour, the above-mentioned mixture of mineral fillers, the above-mentioned latex and the above-mentioned optical brightener, in the proportions defined at the beginning of example 9.

It also implements, in the formulation of the mix, 0.5 parts by dry weight of polyvinyl alcohol as optical brightness medium, and 1 part by dry weight of a copolymer according to the invention.

Said copolymer, which has a specific viscosity of 4.83, is neutralized by soda and consists of:
   a) 13.6% acrylic acid and 3.4% methacrylic acid
   b) 83% of a monomer of formula (I) in which:
       $R_1$ represents hydrogen
       $R_2$ represents hydrogen
       R represents the methacrylate group
       R' represents the methyl radical
       with (m+n+p)q=45

For tests 54 to 59, the viscosity of the coating colours obtained at t=0 are determined at 10 and 100 rpm ($\mu_{10}$ and $\mu_{100}$).

Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

The water retention value is also determined for each coating colour, in accordance with the method described in EP 1 001 083.

The coating colour is subjected to a pressure of 7 bar in a standardized cylinder, and fitted with a filter paper type surface capable of letting the water through. The volume of filtrate of mix collected after 20 minutes ($V_{20\,min}$ in milliliters) and the time from which the first drop crosses the filter paper ($t_{1st\,drop}$ in minutes) are then determined. The retention is better the lower the value of $V_{20\,min}$ and the higher the value of $t_{1st\,drop}$.

All the results corresponding to tests No. 54 to 59 are summed up in table X.

|  |  | Tests | | | | | |
| --- | --- | --- | --- | --- | --- | --- | --- |
| Formulation of mix | Chemical compounds | Prior art 54 | Invention 55 | Invention 56 | Prior art 57 | Invention 58 | Invention 59 |
| Fillers | Setacarb ™ | 80 | 80 | 80 | 80 | 80 | 80 |
|  | Hydragloss ™ 90 | 20 | 20 | 20 | 20 | 20 | 20 |
| Latex | DL950 ™ | 10 | 10 | 10 | 10 | 10 | 10 |
| Optical brightener | Blancophor P ™ | 1 | 1 | 1 | 1 | 1 | 1 |
| Optical brightener medium | PVA 4-98 ™ | 0 | 0 | 0 | 0.5 | 0.5 | 0.5 |
| Polymer according to invention | 13.6% AA 3.4% AMA 83% M MePEG2000 ($\eta_{spe}$ = 14.2) | 0 | 1.5 | 0 | 0 | 0.9 | 0 |
|  | 13.6% AA 3.4% AMA 83% M MePEG2000 ($\eta_{spe}$ = 4.83) | 0 | 0 | 1.0 | 0 | 0 | 1.0 |
| Properties of mix | pH | 8.6 | 8.6 | 8.6 | 8.6 | 8.6 | 8.6 |
|  | Dry Mat.Cont. (%) | 67.3 | 66.8 | 66.8 | 66.7 | 66.9 | 66.9 |
|  | $\mu_{10}$ mPa·s | 2920 | 8700 | 11380 | 1780 | 6160 | 8040 |
|  | $\mu_{100}$ mPa·s | 550 | 1610 | 1880 | 430 | 1390 | 1620 |
|  | $V_{20\,min}$ (ml) | 6.4 | 2.3 | 2.7 | 3.3 | 1.5 | 1.3 |
|  | $t_{1st\,drop}$ (min) | 1'26 | 3'25 | 2'05 | 2'01 | 5'00 | 4'54 |
| Whiteness of coated paper | $R_{457+UV}$ | 92.8 | 95.4 | 95.1 | 96.7 | 98.2 | 98.1 |
|  | $R_{457+UV}$ | 85.0 | 84.9 | 84.9 | 84.7 | 84.6 | 84.6 |
|  | ΔUV | 7.8 | 10.5 | 10.2 | 12.0 | 13.6 | 13.5 |
|  | W (CIE) | 103.3 | 112.2 | 111.2 | 115.1 | 121.7 | 121.8 |

AA designates: acrylic acid
AMA designates: methacrylic acid
M MePEG2000 designates: methoxypolyethylene glycol methacrylate with a molecular weight of 2000

Table X shows that, independently of the presence of polyvinyl alcohol as optical brightness agent, the copolymers according to the invention make a significant improvement to the activation of optical brightness for coated papers, and an improvement in their whiteness.

It is also noted that the use of a copolymer according to the invention makes a significant improvement to the water retention of the coating colour.

Furthermore, it is noted that the Brookfield™ viscosities of the coating colours obtained according to the invention are compatible with the normal industrial application.

EXAMPLE 11

This example relates to the use of copolymers according to the invention as additives in the manufacture of suspensions of previously dispersed and/or ground mineral matter. It also relates to the use of the suspensions thus obtained in the manufacture of coating colour, said coating colour being used to coat papers. This example also relates to the measurement of the optical brightness and whiteness of the papers thus obtained. Finally, this example is designed to illustrate the effectiveness of the copolymers according to the invention in improving the activation of the optical brightness and the whiteness of the coated papers.

In the tests corresponding to this example, use is made of a suspension of calcium carbonate marketed under the name Hydrocarb™ 90 by OMYA.

The next step then is to incorporate a copolymer according to the invention in these suspensions, in a proportion of 1% by dry weight, measured with respect to the dry weight of mineral fillers.

Said suspensions then enter into the composition of the coating colours.

The coating colour is prepared by incorporating, for 100 parts by weight of dry pigment, 10 parts by dry weight of styrene-butadiene latex marketed by DOW CHEMICAL under the name DL920™, and 1 part by weight as is of optical brightener marketed by BAYER under the name Blancophor P™.

These coating colours are then used to coat paper sheets according to the method described in example 2, with a coating weight equal to 15 g/m². Said sheets are 21×29.7 cm precoated paper sheets with a specific weight of 96 g/m². Their whiteness is characterized by the parameters $R_{457+UV}$, $R_{457-UV}$, ΔUV and W(CEE) respectively equal to 88.4–85.8–2.6 and 89.5.

Their viscosity is determined according to the same method as that applied to the aqueous suspensions of mineral matter.

The paper sheets are coated as per the method described in example 2.

Test No. 60

This test illustrates the prior art and implements, in the manufacture of the coating colour the Hydrocarb 90™ calcium carbonate suspension.

Test No. 61

This test illustrates the invention and implements 1% by dry weight, measured with respect to the dry weight of mineral filler, of a copolymer according to the invention as additive in the Hydrocarb 90™ calcium carbonate suspension.

Said copolymer, which has a specific viscosity of 1.52, is neutralized by soda and consists of:

a) 8.5% acrylic acid and 1.5% methacrylic acid
b) 90% of a monomer of formula (I) in which:
   $R_1$ represents hydrogen
   $R_2$ represents hydrogen
   R represents the methacrylate group
   R' represents the methyl radical
   with (m+n+p)q=113

Test No. 62

This test illustrates the prior art and implements the Hydrocarb 90™ calcium carbonate suspension in the manufacture of the coating colour. It also implements, in the manufacture of the coating colour, 1 part (for 100 parts by weight of dry pigment) by dry weight of an optical brightness carrier of the prior art, i.e. polyvinylpyrrolidone marketed by BASF under the name K30™.

Test No. 63

This test illustrates the invention and implements 1% by dry weight, measured with respect to the dry weight of mineral filler, of a copolymer according to the invention to as additive in the Hydrocarb 90™ calcium carbonate suspension.

Said copolymer, which has a specific viscosity of 1.52, is neutralized by soda and consists of:
a) 8.5% acrylic acid and 1.5% methacrylic acid
b) 90% of a monomer of formula (I) in which:
$R_1$ represents hydrogen
$R_2$ represents hydrogen
R represents the methacrylate group
R' represents the methyl radical
with (m+n+p)q=113

It also implements, in the manufacture of the coating colour, 1 part (for 100 parts by weight of dry pigment) by dry weight of an optical brightness carrier of the prior art, i.e. polyvinylpyrrolidone marketed by BASF under the name K30™.

Test No. 64

This test illustrates the prior art and implements the Hydrocarb 90™ calcium carbonate suspension in the manufacture of the coating colour. It also implements, in the manufacture of the coating colour, 1 part (for 100 parts by weight of dry pigment) by dry weight of an optical brightness carrier of the prior art, i.e. methoxypolyethylene glycol of molecular weight 5000.

Test No. 65

This test illustrates the invention and implements 1% by dry weight, measured with respect to the dry weight of mineral filler, of a copolymer according to the invention as additive in the Hydrocarb 90™ calcium carbonate suspension.

Said copolymer, which has a specific viscosity of 1.52, is neutralized by soda and consists of:
a) 8.5% acrylic acid and 1.5% methacrylic acid
b) 90% of a monomer of formula (I) in which:
$R_1$ represents hydrogen
$R_2$ represents hydrogen
R represents the methacrylate group
R' represents the methyl radical
with (m+n+p)q=113

It also implements, in the manufacture of the coating colour, 1 part (for 100 parts by weight of dry pigment) by dry weight of an optical brightness carrier of the prior art, i.e. methoxypolyethylene glycol of molecular weight 5000.

For tests 60 to 65, the viscosity of the mixes obtained at t=0 are determined at 10 and 100 rpm ($\mu_{10}$ and $\mu_{100}$).

Finally the parameters $R_{457+UV}$ and $R_{457-UV}$ are measured for coated papers according to standards NF Q 03-038 and NF Q 03-039, then the difference $\Delta UV = R_{457+UV} - R_{457-UV}$ is calculated, and the W(CIE) parameter is also measured according to standard ISO/FDIS 11475.

All the results corresponding to tests No. 60 to 65 are summed up in table XI.

| | | | Tests | | | | | |
|---|---|---|---|---|---|---|---|---|
| | | | Prior art 60 | Invention 61 | Prior art 62 | Invention 63 | Prior art 64 | Invention 65 |
| Formulation of coating mix | Suspension of filler | Hydragloss ™ 90 | 100 | 100 | 100 | 100 | 100 | 100 |
| | Latex | DL920 ™ | 10 | 10 | 10 | 10 | 10 | 10 |
| | Optical brightener | Blancophor P ™ | 1 | 1 | 1 | 1 | 1 | 1 |
| | Copolymer according to invention | 8.5% AA 1.5% AMA 90% M MePEG5000 | 0 | 1 | 0 | 1 | 0 | 1 |
| | Other additive | K30 ™ | 0 | 0 | 1 | 1 | 0 | 0 |
| | | M MePEG5000: | 0 | 0 | 0 | 0 | 1 | 1 |
| Properties of mix | pHpH | | 8.6 | 8.7 | 8.6 | 8.7 | 8.6 | 8.9 |
| | Dry Mat.Cont. (%) | | 67.1 | 67.0 | 67.1 | 67.0 | 66.9 | 67.0 |
| | $\mu_{10}$ mPa·s | | 640 | 650 | 750 | 2650 | 650 | 1750 |
| | $\mu_{100}$ mPa·s | | 180 | 230 | 200 | 550 | 310 | 360 |
| Properties of coated paper | $R_{457+UV}$ | | 90.8 | 95.5 | 96.6 | 98.3 | 95.3 | 96.3 |
| | $R_{457-UV}$ | | 85.3 | 85.6 | 85.2 | 85.5 | 85.5 | 85.5 |
| | $\Delta UV$ | | 5.5 | 9.9 | 11.4 | 12.7 | 9.8 | 10.7 |
| | W (CIE) | | 92.6 | 110.7 | 114.7 | 119.8 | 110.0 | 114.2 |

AA designates: acrylic acid
AMA designates: methacrylic acid
M MePEG5000 designates: methoxypolyethylene glycol methacrylate with a molecular weight of 5000

Table XI shows that the introduction as additive in the suspension of mineral matter of a copolymer according to the invention significantly improves the activation of the optical brightness of the end product and its whiteness.

Furthermore, it is noted that the Brookfield™ viscosities of the coating colours obtained according to the invention are compatible with the normal industrial application.

EXAMPLE 12

This example relates to the use of copolymers according to the invention as additives in a coating colour manufacturing method and more precisely as co-binder. This example also relates to the measurement of the optical brightness and of the whiteness of the coated papers thus obtained. Finally, this example is designed to illustrate the effectiveness of the copolymers according to the invention in improving the activation of the optical brightness and the whiteness of the coated papers.

In the tests corresponding to this example, use is made of a suspension of calcium carbonate marketed under the name Hydrocarb™ 90 by OMYA which enter into the composition of the coating colours.

The coating colour is prepared by incorporating for 100 parts by weight of dry pigment, 10 parts by dry weight of styrene-butadiene latex marketed by DOW CHEMICAL under the name DL950™, the quantity of co-binder to be tested and 1 part by weight as is of optical brightener marketed by BAYER under the name Blancophor P™.

Said coating colours are then used to coat paper sheets according to the method described in example 2, with a coating weight equal to 15 g/m². Said sheets are 21×29.7 cm precoated paper sheets with a specific weight of 96 g/m².

Their viscosity is determined according to the same method as that applied to the aqueous suspensions of mineral matter.

Said copolymer is neutralized by soda and consists of:
a) 5.9% acrylic acid and 1.6% methacrylic acid
b) 92.5% of a monomer of formula (I) in which:
   $R_1$ represents hydrogen
   $R_2$ represents hydrogen
   R represents the methacrylate group
   R' represents the methyl radical
   With $m=p=0$; $n=113$; $q=1$ and $(m+n+p)q=113$.

Test No. 68

This test illustrates the invention and implements as additive co-binder in the manufacture of the coating colour, 0.8 parts of the same copolymer according to the invention as the one implemented in the test No. 67.

Test No. 69

This test illustrates the invention and implements as additive co-binder in the manufacture of the coating colour, 3 parts of the same copolymer according to the invention as the one implemented in the test No. 67.

Test No. 70

This test illustrates the invention and implements as additive co-binder in the manufacture of the coating colour, 4 parts of the same copolymer according to the invention as that implemented in test No. 67.

For tests 66 to 70, the viscosity of the coating colours obtained at t=0 are determined at 10 and 100 rpm ($\mu10$ and $\mu100$).

Finally the parameters $R_{457+UV}$ and $R_{457-UV}$ are measured for coated papers according to standards NF Q 03-038 and NF Q 03-039, then the difference $\Delta UV=R_{457+UV}-R_{457-UV}$ is calculated, and the W(CIE) parameter is also measured according to standard ISO/FDIS 11475.

All the results corresponding to tests No. 66 to 70 are summed up in table XII.

| Formulation of coating colour | Chemical compounds | Prior Art 66 | Invention 67 | Invention 68 | Invention 69 | Invention 70 |
|---|---|---|---|---|---|---|
| Fillers | Hydrocarb ™ 90 | 100 | 100 | 100 | 100 | 100 |
| Latex | DL950 ™ | 10 | 10 | 10 | 10 | 10 |
| Optical brightener | Blancophor P ™ | 1 | 1 | 1 | 1 | 1 |
| Co-binder | Rheocoat ™35 | 0.2 | 0 | 0 | 0 | 0 |
|  | Polymer according to invention | 0 | 0.2 | 0.8 | 3.0 | 4.0 |
| Properties of coating colour | pH | 8.5 | 8.5 | 8.5 | 8.6 | 8.6 |
|  | Dry Mat. Cont. (%) | 66.8 | 67.0 | 67.0 | 67.0 | 65.0 |
|  | $\mu_{10}$ mPa · s | 25200 | 8030 | 16000 | 34600 | 43200 |
|  | $\mu_{100}$ mPa · s | 3700 | 1470 | 2510 | 6430 | 6300 |
| Whiteness of coated paper | $R_{457+UV}$ | 89.7 | 91.3 | 91.5 | 92.2 | 92.5 |
|  | $R_{457-UV}$ | 85.5 | 85.3 | 85.2 | 85.1 | 85.3 |
|  | $\Delta UV$ | 4.2 | 6.0 | 6.3 | 7.1 | 7.2 |
|  | W(CIE) | 88.6 | 94.2 | 97.2 | 101.3 | 101.1 |

The paper sheets are coated as per the method described in example 2.

Test No. 66

This test illustrates the prior art and implements in the manufacture of the coating colour, 0.2 parts of a co-binder of the prior art marketed by COATEX under the name Rheocoat™ 35.

Test No. 67

This test illustrates the invention and implements in the manufacture of the coating colour, 0.2 parts of a copolymer according to the invention as additive co-binder.

Table XII shows that the use of copolymers according to the invention as additives in the coating colour makes a significant improvement to the activation of the optical brightness and the whiteness of the coated papers.

The invention claimed is:

1. An agent for improving the activation of optical brightness, comprising a water-soluble copolymer having at least one alkoxy or hydroxy polyalkylene glycol function grafted onto at least one ethylenically unsaturated monomer.

2. The agent for improving the activation of optical brightness according to claim 1, wherein the agent is a water-soluble copolymer consisting of at least one monomer of formula (I):

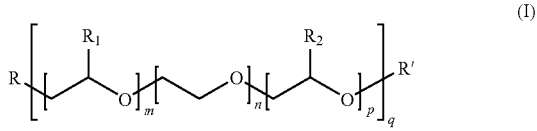

wherein
- m and p represent a number of alkylene oxide units less than or equal to 150,
- n represents a number of ethylene oxide units less than or equal to 150,
- q represents an integer equal to at least 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides, and
- R' represents hydrogen or a hydrocarbon radical having from 1 to 40 carbon atoms.

3. The agent for improving the activation of optical brightness according to claim 1, wherein said agent is a water-soluble copolymer consisting of:
a) at least one anionic monomer with a carboxylic or dicarboxylic or phosphoric or phosphonic or sulfonic function or a mixture thereof,
b) at least one non-ionic monomer, the non-ionic monomer consisting of at least one monomer of formula (I):

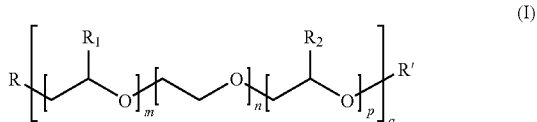

wherein
- m and p represent a number of alkylene oxide units less than or equal to 150,
- n represents a number of ethylene oxide units less than or equal to 150,
- q represents an integer equal to at least 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides, and
- R' represents hydrogen or a hydrocarbon radical having from 1 to 40 carbon atoms, or a mixture of several monomers of formula (I),
c) optionally, at least one monomer of the acrylamide or methacrylamide type or their derivatives and mixtures thereof, at least one non water-soluble monomer and their derivatives, at least one cationic monomer or quaternary ammonium at least one organofluorinated or organosilylated monomer, or a mixture of several of these monomers, and
d) optionally, at least one monomer having at least two ethylenic insaturations referred to as a crosslinking monomer,
the total of the proportions of components a), b), c) and d) being equal to 100%.

4. The agent improving the activation of optical brightness according to claim 3, wherein the organosilylated monomer is selected from the group consisting of molecules of formulae (IIa) and (IIb),
with formula (IIa)

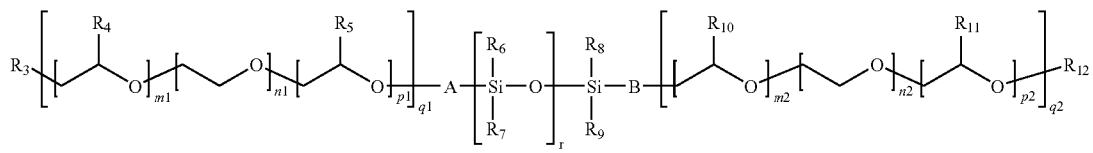

wherein
- $m_1$, $p_1$, $m_2$ and $p_2$ represent a number of alkylene oxide units less than or equal to 150,
- $n_1$ and $n_2$ represent a number of ethylene oxide units less than or equal to 150,
- $q_1$ and $q_2$ represent an integer equal to at least 1 and such that $0 \leq (m_1+n_1+p_1)q_1 \leq 150$ and $0 \leq (m_2+n_2+p_2)q_2 \leq 150$,
- r represents a number such that $1 \leq r \leq 200$,
- $R_3$ represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent straight or branched alkyl, aryl, alkylaryl or arylalkyl groups having from 1 to 20 carbon atoms, or a mixture thereof,
- $R_{12}$ represents a hydrocarbon radical having from 1 to 40 carbon atoms, and A and B are groups which may be present, in which case they represent a hydrocarbon radical having from 1 to 4 carbon atoms, with formula (IIb)

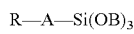

wherein
- R represents a radical comprising a polymerizable unsaturated function, belonging to the vinyl group and to the group of acrylic, methacrylic, maleic, itaconic, crotonic, and vinylphtalic esters and to the group of urethane unsaturates and to the group of allyl or vinyl ethers, whether or not substituted, or to the group of ethylenically unsaturated amides or imides,
- A is a group which may be present, in which case it represents a hydrocarbon radical having from 1 to 4 carbon atoms,
- B represents a hydrocarbon radical having from 1 to 4 carbon atoms, or a mixture of several of said monomers, and wherein the crosslinking monomer is selected from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, and allyl ethers prepared from polyols, or selected from the group consisting of molecules of formula (III):

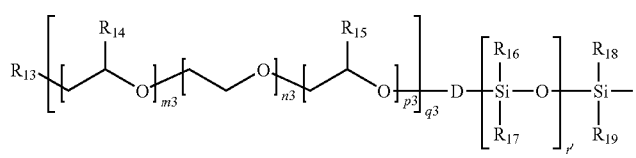

wherein
- $m_3$, $p_3$, $m_4$ and $p_4$ represent a number of alkylene oxide units less than or equal to 150,
- $n_3$ and $n_4$ represent a number of ethylene oxide units less than or equal to 150
- $q_3$ and $q_4$ represent an integer equal to at least 1 and such that $0 \leq (m_3+n_3+p_3)q_3 \leq 150$ and $0 \leq (m_4+n_4+p_4)q_4 \leq 150$,
- r' represents a number such that $1 \leq r' \leq 200$,
- $R_{13}$ represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof, and
- D and E are groups which may be present, in which case they represent a hydrocarbon radical having from 1 to 4 carbon atoms, or a mixture of several of said monomers.

5. The agent for improving the activation of optical brightness according to claim 1, wherein the agent is a water-soluble copolymer consisting, by weight, of:

a) from 2% to 95% of at least one ethylenically unsaturated anionic monomer having a monocarboxylic function selected from the group consisting of ethylenically unsaturated monomers having a monocarboxylic function, ethylenically unsaturated monomers having a dicarboxylic function, ethylenically unsaturated monomers having a sulfonic function, ethylenically unsaturated monomers having a phosphoric function, ethylenically unsaturated monomers having a phosphonic function and mixtures thereof, b) from 2 to 95% of at least one non-ionic ethylenically unsaturated monomer of formula (I):

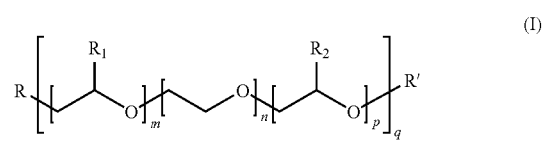

wherein
- m and p represent a number of alkylene oxide units less than or equal to 150,
- n represents a number of ethylene oxide units less than or equal to 150,
- q represents an integer equal to at least 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides, and
- R' represents hydrogen or a hydrocarbon radical having from 1 to 40 carbon atoms, or a mixture of several monomers of formula (I), c) from 0% to 5% of at least one monomer of the acrylamide or methacrylamide type or their derivatives and mixtures thereof, at least one non water-soluble monomer, unsaturated esters, vinyls and their derivatives, at least one cationic monomer or quaternary ammonium, at least one organofluorinated monomer, or at least one organosilylated monomer selected from the group consisting of molecules of formulae (IIa) and (IIb), with formula (IIa)

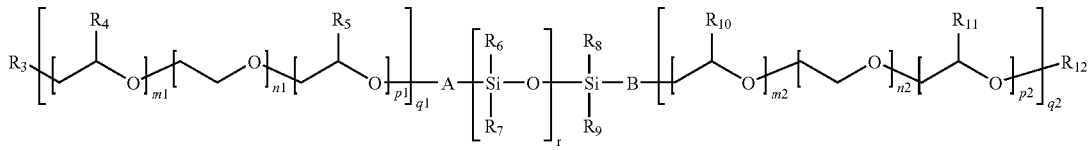

wherein
- $m_1$, $p_1$, $m_2$ and $p_2$ represent a number of alkylene oxide units less than or equal to 150,
- $n_1$ and $n_2$ represent a number of ethylene oxide units less than or equal to 150,
- $q_1$ and $q_2$ represent an integer equal to at least 1 and such that $0 \leq (m_1+n_1+p_1)q_1 \leq 150$ and $0 \leq (m_2+n_2+p_2)q_2 \leq 150$,

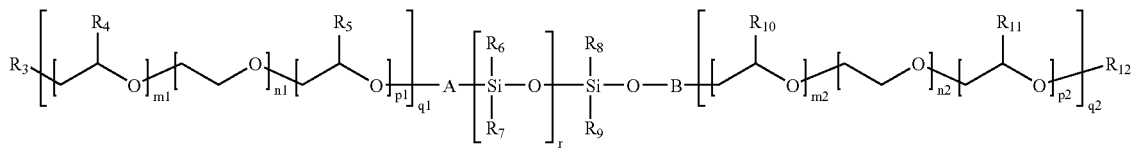

- r represents a number such that $1 \leq r \leq 200$,
- $R_3$ represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent straight or branched alkyl, aryl, alkylaryl or arylalkyl groups having from 1 to 20 carbon atoms, or a mixture thereof,
- $R_{12}$ represents a hydrocarbon radical having from 1 to 40 carbon atoms, and
- A and B are groups which may be present, in which case they represent a hydrocarbon radical having from 1 to 4 carbon atoms, with formula (IIb)

R—A—Si(OB)$_3$ wherein
- R represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides,
- A is a group which may be present, in which case it represents a hydrocarbon radical having from 1 to 4 carbon atoms, and
- B represents a hydrocarbon radical having from 1 to 4 carbon atoms, or a mixture of several of said monomers, d) from 0% to 3% of at least one crosslinking monomer selected from the group consisting of ethylene glycol dimethacrylate, trimethylolpropanetriacrylate, allyl acrylate, the allyl maleates, methylene-bis-acrylamide, methylene-bis methacrylamide, tetrallyloxyethane, triallylcyanurates, and allyl ethers prepared from polyols, or selected from the group consisting of molecules of formula (III):

wherein
- $m_3$, $p_3$, $m_4$ and $p_4$ represent a number of alkylene oxide units less than or equal to 150,
- $n_3$ and $n_4$ represent a number of ethylene oxide units less than or equal to 150,
- $q_3$ and $q_4$ represent an integer equal to at least 1 and such that $0 \leq (m_3+n_3+p_3)q_3 \leq 150$ and $0 \leq (m_4+n_4+p_4)q_4 \leq 150$,
- r' represents a number such that $1 \leq r' \leq 200$,
- $R_{13}$ represents a radical comprising a polymerizable unsaturated function, belonging to the vinyl group and to the group of acrylic, methacrylic, maleic, itaconic, crotonic, and vinylphtalic esters and to the group of urethane unsaturates, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof, and
- D and E are groups which may be present, in which case they represent a hydrocarbon radical having from 1 to 4 carbon atoms or a mixture of several of said monomers,
the total of the proportions of components a), b), c) and d) being equal to 100%.

6. The agent for improving the activation of optical brightness according to claim 1, wherein the agent is a copolymer in acid form or fully or partially neutralized by one or more neutralization agents having a monovalent neutralizing function or a polyvalent neutralizing function.

* * * * *